(12) United States Patent
Takata et al.

(10) Patent No.: US 12,136,719 B2
(45) Date of Patent: Nov. 5, 2024

(54) POWER SUPPLY DEVICE, ELECTRIC VEHICLE COMPRISING SAID POWER SUPPLY DEVICE, AND POWER STORAGE DEVICE

(71) Applicant: SANYO Electric Co., Ltd., Osaka (JP)

(72) Inventors: Hiroshi Takata, Hyogo (JP); Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 461 days.

(21) Appl. No.: 17/632,060

(22) PCT Filed: Jul. 20, 2020

(86) PCT No.: PCT/JP2020/028029
§ 371 (c)(1),
(2) Date: Feb. 1, 2022

(87) PCT Pub. No.: WO2021/024776
PCT Pub. Date: Feb. 11, 2021

(65) Prior Publication Data
US 2022/0278387 A1 Sep. 1, 2022

(30) Foreign Application Priority Data
Aug. 3, 2019 (JP) .................................. 2019-143428

(51) Int. Cl.
*H01M 10/6551* (2014.01)
*H01M 10/04* (2006.01)
(Continued)

(52) U.S. Cl.
CPC ... *H01M 10/6551* (2015.04); *H01M 10/0481* (2013.01); *H01M 10/613* (2015.04);
(Continued)

(58) Field of Classification Search
CPC ......... H01M 10/6551; H01M 10/0481; H01M 10/613; H01M 10/651; H01M 10/6554;
(Continued)

(56) References Cited

U.S. PATENT DOCUMENTS 11,563,255 B2 * 1/2023 Yoshida ............ H01M 10/6557
11,757,144 B2 * 9/2023 Naito .................. H01M 10/658
429/120
(Continued)

FOREIGN PATENT DOCUMENTS

CN 104078720 A 10/2014
CN 107534196 A 1/2018
(Continued)

OTHER PUBLICATIONS

English translation of Search Report dated Dec. 21, 2023, issued in counterpart CN Application No. 202080055034.4. (3 pages).
(Continued)

*Primary Examiner* — Peter G Leigh
*Assistant Examiner* — Nader J Alhawamdeh
(74) *Attorney, Agent, or Firm* — WHDA, LLP

(57) ABSTRACT

Power supply device includes: battery stack formed by stacking a plurality of battery cells; a pair of end plates disposed at both ends of the battery stack; binding bars configured to connect the pair of end plates; lower plate that is brought into contact with heat radiation surfaces of battery cells forming the battery stack and to which heat energy of battery cell is transferred; and heat conductive sheet having plasticity and stacked on a surface of lower plate. In lower plate, contact surface that is brought into contact with heat conductive sheet is regular uneven surface, heat conductive sheet is stacked on uneven surface in a pressed state, heat conductive surface of heat conductive sheet is deformed into a concave shape along uneven surface, and heat conductive
(Continued)

sheet and lower plate are stacked on each other in a contact state.

13 Claims, 14 Drawing Sheets

(51) Int. Cl.
    *H01M 10/613*      (2014.01)
    *H01M 10/651*      (2014.01)
    *H01M 10/6554*     (2014.01)
    *H01M 10/625*      (2014.01)

(52) U.S. Cl.
    CPC ..... *H01M 10/651* (2015.04); *H01M 10/6554* (2015.04); *H01M 10/625* (2015.04)

(58) Field of Classification Search
    CPC ............. H01M 10/625; H01M 50/249; H01M 10/647; H01M 2220/20; H01M 10/653; H01M 10/627; Y02E 60/10
    See application file for complete search history.

(56) References Cited

U.S. PATENT DOCUMENTS

| | | | |
|---|---|---|---|
| 11,929,479 B2 * | 3/2024 | Yamashiro | H01M 50/293 |
| 2009/0246606 A1 | 10/2009 | Shimizu | |
| 2013/0034764 A1 * | 2/2013 | Ochi | H01M 50/141 |
| | | | 429/99 |
| 2014/0220391 A1 * | 8/2014 | Fujii | H01M 50/264 |
| | | | 429/7 |
| 2014/0295241 A1 | 10/2014 | Tao et al. | |
| 2015/0144409 A1 * | 5/2015 | Fujii | H01M 50/519 |
| | | | 429/121 |
| 2018/0138559 A1 * | 5/2018 | Omura | B60L 50/66 |
| 2018/0138565 A1 | 5/2018 | Lee et al. | |
| 2021/0288363 A1 | 9/2021 | Okada et al. | |
| 2022/0278387 A1 * | 9/2022 | Takata | H01M 10/6554 |
| 2022/0294064 A1 * | 9/2022 | Takahashi | H01M 50/242 |
| 2022/0416328 A1 * | 12/2022 | Takahashi | H01M 10/613 |

FOREIGN PATENT DOCUMENTS

| | | | | |
|---|---|---|---|---|
| CN | 109643777 A | | 4/2019 | |
| EP | 2784870 A1 | | 10/2014 | |
| JP | 2009-238645 | | 10/2009 | |
| JP | 2010-040420 | | 2/2010 | |
| JP | 2010-277863 | | 12/2010 | |
| JP | 2011-023296 | | 2/2011 | |
| JP | 2013-125617 A | | 6/2013 | |
| JP | 2013-229182 | | 11/2013 | |
| JP | 2018-518032 | | 7/2018 | |
| JP | 2018/147607 A | | 9/2018 | |
| JP | 2018-166212 A | | 10/2018 | |
| WO | WO-2012133707 A1 * | 10/2012 | ............. B60L 1/003 |
| WO | 2013/161654 A1 | | 10/2013 | |
| WO | 2018/042763 | | 3/2018 | |

OTHER PUBLICATIONS

International Search Report of PCT application No. PCT/JP2020/028029 dated Oct. 6, 2020.

Extended (Supplementary) European Search Report dated Oct. 12, 2022, issued in counterpart EP application No. 20849017.7. (7 pages).

* cited by examiner

POWER SUPPLY DEVICE, ELECTRIC VEHICLE COMPRISING SAID POWER SUPPLY DEVICE, AND POWER STORAGE DEVICE

TECHNICAL FIELD

The present invention relates to a power supply device formed by stacking a plurality of angular battery cells, an electric vehicle including the power supply device, and a power storage device.

BACKGROUND ART

In a power supply device that is formed by stacking a large number of battery cells, it is important to maintain the battery cells that generate heat by charging and discharging at a predetermined temperature by cooling the battery cells. This is because the rise of a temperature of the battery cells causes lowering of electric characteristics of the battery thus shortening the life of the battery and lowering of safety of the battery.

There has been developed a power supply device where a battery stack is formed by stacking a plurality of battery cells, and a lower plate is brought into contact with a heat radiation surface of a bottom surface of the battery stack.

CITATION LIST

PTL 1: Unexamined Japanese Patent Publication No. 2009-238645
PTL 2: Unexamined Japanese Patent Publication No. 2010-277863
PTL 3: Unexamined Japanese Patent Publication No. 2010-40420

SUMMARY OF THE INVENTION

In power supply devices descried in these literatures, a pair of end plate is disposed on both ends of a battery stack formed by stacking battery cells, and the battery cells are fixed in a stacked state by connecting the end plates by a connecting jig. A lower plate is disposed on a heat radiation surface for cooling the battery cells which form the battery stack. To enable the lower plate to achieve a favorable contact state, a heat conductive sheet is stacked on the lower plate. The lower plate is brought into close contact with the heat conductive sheet. The contact between the heat conductive sheet and the lower plate can be achieved by imparting a wide area to both of them. However, in an assembly step or in an in-use state, it is considerably difficult to bring the heat conductive sheet and the lower plate into contact with each other over a wide area. Such difficulty in bringing the heat conducive sheet and the lower plate into contact with each other hinders an ideal contact state, and obstructs an effective heat radiation by the lower plate.

The present invention has been made to solve the above-mentioned problem. It is an object of the present invention to provide a technique that can efficiently radiate heat energy of battery cells using a lower plate by bringing the lower plate and a heat conductive sheet into a favorable contact state.

Solution to Problem

A power supply device according to an aspect of the present invention includes: battery stack 10 formed by stacking a plurality of battery cells 1; a pair of end plates 4 disposed at both ends of battery stack 10; binding bar 2 configured to connect the pair of end plates 4; lower plate 16 being brought into contact with heat radiation surfaces 1X of battery cells 1 forming battery stack 10, lower plate 16 allowing transfer of heat energy generated by battery cells 1 through lower plate 16; and heat conductive sheet 17 being stacked on a surface of lower plate 16, heat conductive sheet 17 having plasticity. Lower plate 16 has contact surface 16a, 16b that is brought into contact with heat conductive sheet 17, contact surface 16a, 16b being formed of a regular uneven surface 16X, heat conductive sheet 17 is stacked on uneven surface 16X in a pressed state, heat conductive surface 17X of heat conductive sheet 17 is deformed into a concave shape along uneven surface 16X, and heat conductive sheet 17 and lower plate 16 are stacked on each other in a contact state.

An electric vehicle according to an aspect of the present invention includes: power supply device 100; motor 93 for traveling vehicle that is configured to receive electric power from power supply device 100; vehicle body 91 on which power supply device 100 and motor 93 are mounted; and wheels 97 that are driven by motor 93 for enabling traveling of vehicle body 91.

A power storage device according to an aspect of the present invention includes: power supply device 100; and power supply controller 88 configured to control charging and discharging of power supply device 100, wherein power supply controller 88 enables charging of battery cells 1 with electric power supplied from an outside and is configured to control charging to battery cells 1.

Advantageous Effect of Invention

The power supply device described above has a characteristic that the lower plate and the heat conductive sheet are brought into a favorable contact state so that heat generated by the battery cells can be efficiently radiated by the lower plate.

BRIEF DESCRIPTION OF DRAWINGS

FIG. 5A is an enlarged cross-sectional view illustrating a state in which a gap between a heat radiation surface and a lower plate is wide, and FIG. 5B is an enlarged cross-sectional view illustrating a state in which the gap between the heat radiation surface and the lower plate is narrow.

FIG. 7A and FIG. 7B are an enlarged cross-sectional view of a main part of the power supply device illustrated in FIG. 6, which FIG. 7A is an enlarged cross-sectional view illustrating a state in which a gap between a heat radiation surface and a lower plate is wide, and FIG. 7B is an enlarged cross-sectional view illustrating a state in which the gap between the heat radiation surface and the lower plate is narrow.

DESCRIPTION OF EMBODIMENTS

Figure 1:
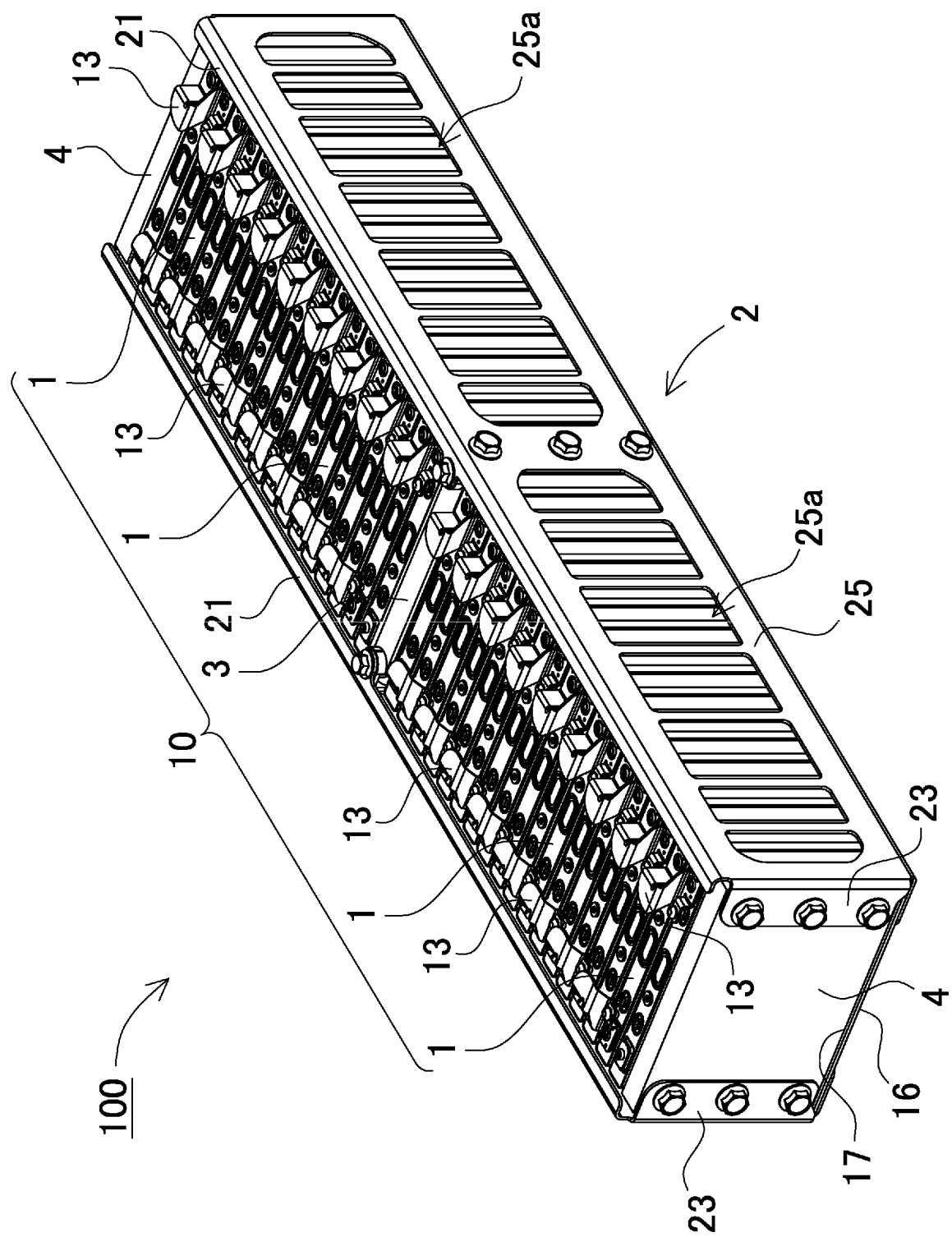
FIG. 1 is a perspective view of a power supply device according to an exemplary embodiment of the present invention.

Hereinafter, the present invention will be described in detail with reference to the drawings. Note that, in the following description, terms (for example, "up", "down", and other terms including those terms) indicating specific directions or positions are used as necessary. However, those terms are provided for facilitating the understanding of the invention with reference to the drawings, and the technical scope of the present invention is not limited by the meanings of the terms. Parts denoted by the same symbols appearing in a plurality of drawings indicate identical or substantially identical parts or members.

Further, exemplary embodiments described below show specific examples of the technical concept of the present invention, and the present invention is not limited to the exemplary embodiments described below. Unless specifically stated otherwise, dimensions, materials, shapes, relative arrangement, and the like, of components described below are not intended to limit the scope of the present invention to only these matters. These matters are intended to be provided for an exemplifying purpose. The contents described in one exemplary embodiment or an example are also applicable to other exemplary embodiments and other examples. Further, sizes, positional relationships, and the like of the members illustrated in the drawings may be exaggerated for clarifying the contents of description.

A power supply device according to a first aspect of the present invention includes: a battery stack formed by stacking a plurality of battery cells; a pair of end plates disposed at both ends of the battery stack; a binding bar configured to connect the pair of end plates; a lower plate being brought into contact with heat radiation surfaces of the plurality of battery cells forming the battery stack, the lower plate allowing transfer of heat energy generated by the plurality of battery cells through the lower plate; and a heat conductive sheet being stacked on a surface of the lower plate, the heat conductive sheet having plasticity, wherein the lower plate has a contact surface that is brought into contact with the heat conductive sheet, the contact surface being formed of a regular uneven surface, the heat conductive sheet is stacked on the uneven surface in a pressed state, a heat conductive surface of the heat conductive sheet is deformed into a concave shape along the uneven surface, and the heat conductive sheet and the lower plate are stacked on each other in a contact state.

The power supply device described above has an advantage that the lower plate and the heat conductive sheet are brought into contact with each other over a wide area and hence, heat generated by the battery cells can be efficiently radiated by the lower plate. This is because the contact surface of the lower plate is formed of the uneven surface, and the heat conductive sheet is stacked on the lower plate in a state where the heat conductive sheet is pressed to the uneven surface and is deformed in a shape along the uneven surface. One surface of the heat conductive sheet is sandwiched by a facing surface of the lower plate, and the facing surface is bonded to the heat conductive sheet in a contact state. The heat conductive sheet sandwiched between completely parallel facing surfaces is brought into close contact with the facing surfaces without forming a gap so that an ideal contact state is achieved. However, in an actual configuration, it is extremely difficult to always bring the facing surfaces that sandwich the heat conductive sheet into a completely parallel state, and a gap between the facing surfaces differs depending on portions. The heat conductive sheet located at a narrow interval is sandwiched by and closely brought into close contact with the facing surface. On the other hand, the heat conductive sheet is not brought into close contact with the facing surface at a portion disposed at a partially wide interval. However, in the case of the heat conductive sheet that is pressed against the uneven surface of the lower plate, the protruding portion of the uneven surface protrudes toward the heat conductive sheet and is brought into contact with the heat conductive sheet even in regions where the gap between the facing surface is wide. Accordingly, the heat conductive sheet is brought into contact with the lower plate even when the heat conductive sheet is sandwiched between the facing surfaces which are not perfectly parallel surfaces. The heat conductive sheet sandwiched between the region where the gap between the facing surfaces is narrow intrudes into the concave portion of the uneven surface and is thinly collapsed to achieve a face contact state in which the facing surfaces are brought into contact with each other with a larger area than the planar surface. That is, in the lower plate having the uneven surface, the heat conductive sheet and the lower plate are brought into contact with each other locally even in a region where the gap between the facing surfaces is wide so that the lower plate cannot be brought into contact with each other on a planar surface. Further, in a region where the gap between the facing surfaces is narrow, the contact area is increased. Accordingly, an ideal contact state is achieved.

In the power supply device according to a second aspect of the present invention, the heat conductive sheet is formed of a flexible sheet formed by bonding heat conductive particles by a binder.

In the power supply device according to a third aspect of the present invention, the heat conductive sheet is formed of a flexible sheet formed by embedding heat conductive particles into a silicon resin.

In the power supply device according to a fourth aspect of the present invention, the heat conductive sheet has a thickness which is set to a value which falls within a range of 0.5 mm 10 mm inclusive.

In the power supply device according to and a fifth aspect of the present invention, a height (h) of an unevenness of the lower plate is set to a value which falls within a range from 10% to 80% inclusive of the thickness (d) of the heat conductive sheet.

In the power supply device according to a sixth aspect of the present invention, a pitch (t) of the unevenness of the uneven surface is set to ½ or more and 5 times or less as large as a height (h) of the uneven surface of the lower plate.

In a power supply device according to a seventh aspect of the present invention, the heat conductive sheet includes: a first heat conductive sheet stacked on an inner contact surface of the lower plate close to a battery stack; and a second heat conductive sheet stacked on a contact surface of the lower plate on an outer side, wherein the lower plate is formed such that either or both of an inner contact surface stacked on the first heat conductive sheet and an outer contact surface stacked on the second heat conductive sheet are formed of an uneven surface.

In the power supply device according to an eighth aspect of the present invention, the uneven surface includes a plurality of rows of protruding ridges extending in a longitudinal direction of the heat radiation surfaces of the plurality of battery cells.

In a power supply device according to a ninth aspect of the present invention, the uneven surface includes a plurality of rows of protruding ridges extending in a direction that intersects with the longitudinal direction of the heat radiation surfaces of the plurality of battery cells.

In the power supply device according to a tenth aspect of the present invention, the uneven surface has a groove between a plurality of rows of protruding ridges that are arranged in parallel thus forming a corrugated cross-sectional shape.

In the power supply device according to an eleventh aspect of the present invention, a distal end portion of a protruding portion of the uneven surface is formed in a flat plate shape or a curved shape.

First Exemplary Embodiment

Figure 2:
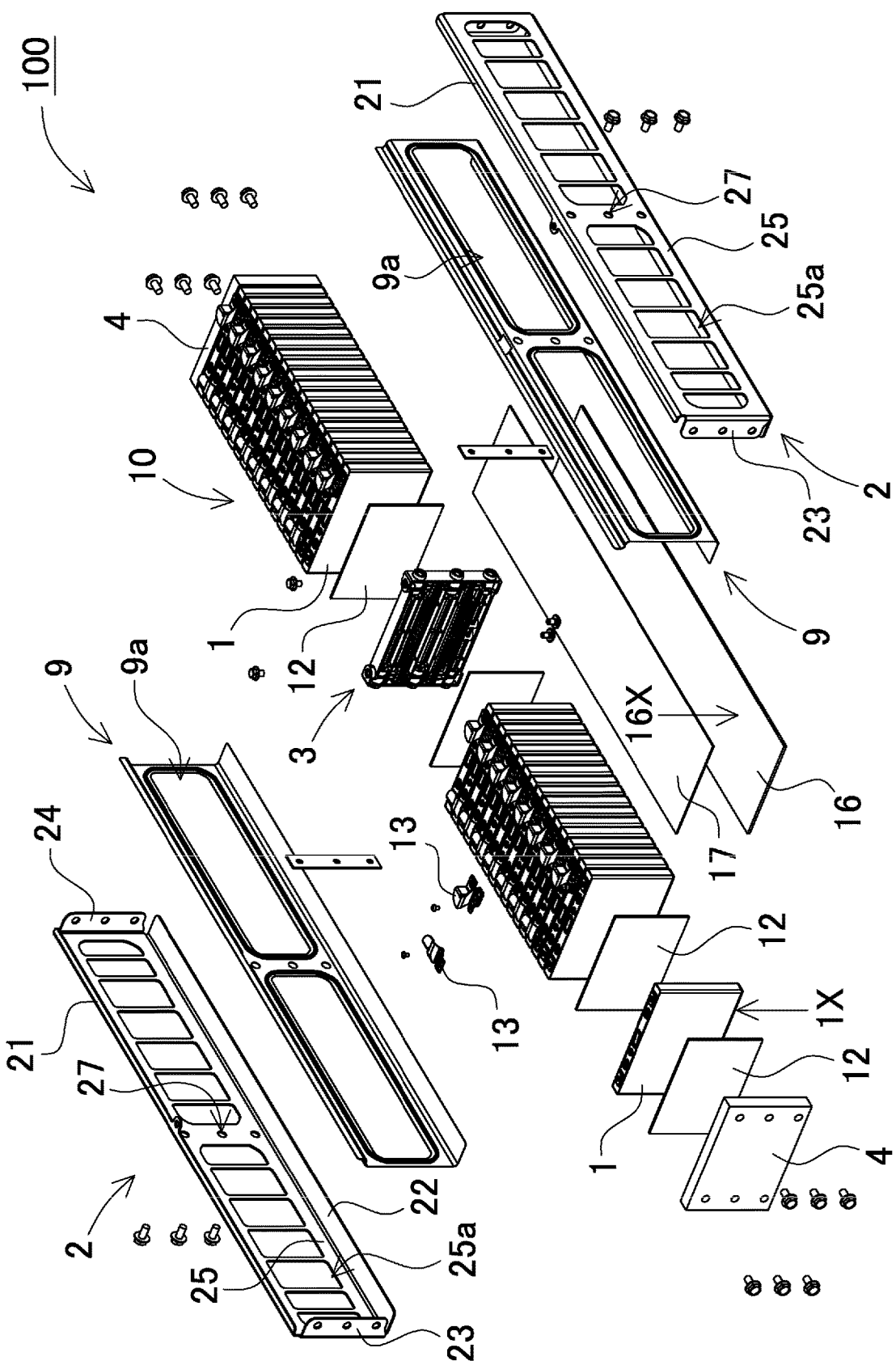
FIG. 2 is an exploded perspective view of the power supply device illustrated in FIG. 1.
Figure 3:
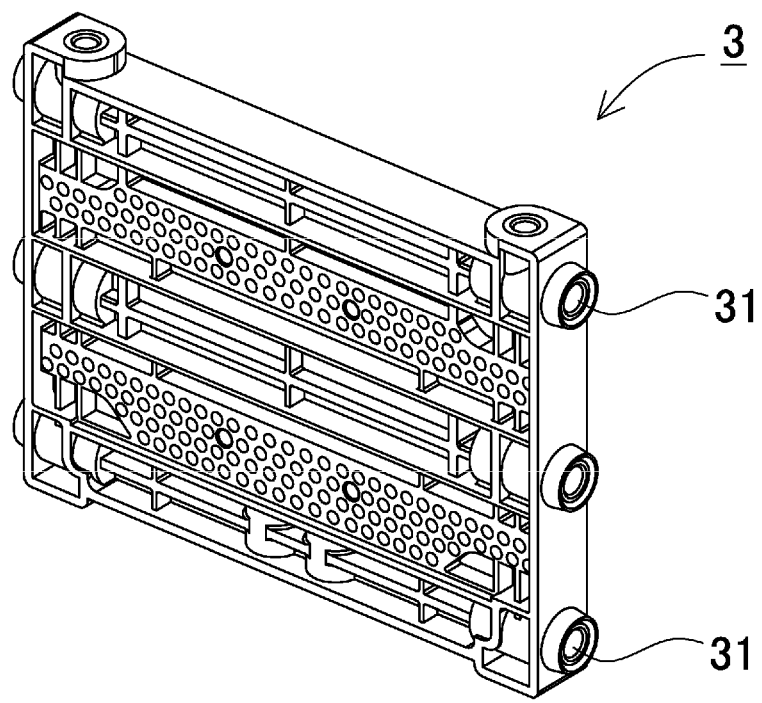
FIG. 3 is a perspective view of an intermediate plate.

FIGS. 1 to 3 each illustrate power supply device 100 according to a first exemplary embodiment of the present invention. Power supply device 100 illustrated in these drawings is an example of a vehicle-mounted power supply device. Specifically, power supply device 100 is manly mounted on an electric vehicle such as a hybrid automobile or an electric automobile, and is used as a power supply that makes the vehicle travel by supplying power to a motor for vehicle traveling. The power supply device according to the present invention can be used in an electric vehicles other than a hybrid automobile and an electric automobile. Further, the power supply device according to the present invention can also be used in applications such as an uninterruptible power supply where a large output is required other than the electric vehicle.

(Power Supply Device 100)

Power supply device 100 illustrated in FIG. 1 and FIG. 2 includes: battery stack 10 formed by stacking a plurality of battery cells 1; a pair of end plates 4 disposed at both ends of battery stack 10; binding bars 2 configured to connect the pair of end plates 4; lower plate 16 being brought into contact with heat radiation surfaces of battery cells 1 forming battery stack 10, to allow transfer of heat energy generated by battery cells 1 through lower plate 16; and heat conductive sheet 17 being stacked on a surface of lower plate 16, heat conductive sheet 17 having plasticity. A profile of battery cell 1 is formed into a plate shape where a thickness is set smaller than a width, and a main surface of battery cell 1 has a rectangular shape. A plurality of battery cell 1 are stacked. Battery cells 1 are insulated from each other by an insulating member such as separator 12 sandwiched between battery cells 1. In a state where battery cells 1 are alternately stacked with separator 12 sandwiched between battery cells 1, end plates 4 are deposed on end surfaces of battery stack 10 on both sides. The pair of end plates 4 fixed to binding bar 2 so as to fix battery stack 10 in a pressurized state between end plates 4. Lower plate 16 is stacked on heat radiation surface 1X of a bottom surface of battery stack 10 with heat conductive sheet 17 sandwiched between heat radiation surface 1X and lower plate 16.

(Battery Cell 1)

Battery cell 1 has an exterior can which forms an outer profile of battery cell 1. The exterior can is formed in an angular shape where the thickness is set smaller than the width. The exterior can is formed in a bottomed cylindrical shape having an upper opening, and an opening portion is closed by a sealing plate. An electrode assembly is housed in the exterior can. Positive and negative electrode terminals are mounted on the sealing plate, and a gas release valve is mounted on the sealing plate between the electrode terminals. The battery cell is formed such that a surface of the exterior can is covered by an insulation film (not illustrated) such as a heat shrinkable tube. The electrode terminals and the exhaust valve are mounted on the surface of the sealing plate and hence, the surface of the sealing plate is not covered by the insulation film and is exposed to the outside. Battery cells 1 are electrically connected to each other by bus bars 13 or the like. Bus bar 13 is formed by bending a metal plate.

The insulating member such as separator 12 made of a resin is interposed between battery cells 1 disposed adjacently to each other and hence, insulation is provided between battery cells 1. The battery cell whose surface is covered by the insulation film can be stacked without interposing the separator. Insulation can be provided between the battery cells only by interposing the separator made of a resin without insulating the surface of the exterior can of the battery cell by the heat shrinkable tube.

(Separator 12)

As illustrated in FIG. 2 that is an exploded perspective view, separator 12 is interposed between main surfaces of battery cells 1 disposed adjacently to each other (the main surfaces facing each other) and provides insulation between these battery cells 1. Separator 12 is manufactured as an insulation member having a thin plate shape or a sheet shape. Separator 12 illustrated in the drawing is formed in a plate shape having substantially the same size as a surface of separator 12 that faces battery cell 1. By stacking separator 12 between battery cells 1 disposed adjacently to each other, battery cells 1 disposed adjacently to each other are insulated from each other. As the separator, it is possible to use a separator having a shape by which a cooling gap that forms a flow passage for a cooling gaseous body is formed between the separator and the battery cell disposed adjacently to the separator. By forcibly supplying the cooling gaseous body in the cooling gap, the battery cells can be cooled. The separator is connected to a cooling mechanism that cools a surface of the battery cell by forcibly supplying a cooling gaseous body such as air or a cooling gaseous body into the cooling gap. On the other hand, the battery cell may adopt the structure where a bottom surface forms a heat radiation surface, and the battery cells are cooled from the bottom surface by disposing the lower plate in a contact state with the bottom surface. In this case, a cooling gap is not formed between the battery cells. Further, a surface of the battery cell may be cooled by forming a cooling gap between the battery cells, and the battery cells can be also cooled from the bottom surface by bringing the lower plate into contact with a heat radiation surface of the bottom surface.

Separator 12 is made of an insulating material. For example, by forming separator 12 using a resin such as a plastic, separator 12 having a light weight can be formed at a low cost. Separator 12 is formed of a hard member. However, separator 12 may be formed of a member having flexibility. In particular, in separator 12 in a mode where a cooling gap is not formed in separator 12, separator 12 may be formed of a thin sheet-shaped material having flexibility. In case of the sheet-shaped separator, with the use of the separator having an adhesive surface on one surface of the separator by coating, it is possible to easily stack the separator to regions that require insulation such as main surfaces and some side surfaces of battery cell 1. Further, by forming the separator in a sheet-shape, the separator can be easily made thin and hence, the increase of a thickness and a weight of battery stack 10 can also be also suppressed.

(End Plate 4)

The pair of end plates 4 is disposed on both end surfaces of battery stack 10 that is formed by alternately stacking battery cells 1 and separators 12. Battery stack 10 is fastened by the pair of end plates 4. End plate 4 is made of a material having sufficient rigidity such as metal, for example. The end plate may be made of a resin. Further, the end plate may be also formed such that the end plate made of a resin is reinforced by a member made of metal. In the example illustrated in FIG. 2, end plate 4 is made of a sheet of metal plate.

(Binding Bar 2)

Both end portions of each of binding bars 2 are fixed to end plates 4. As illustrated in FIG. 1 and FIG. 2, binding bars 2 are disposed on both side surfaces of battery stack 10 where end plates 4 are stacked on both ends of battery stack 10. End portions of binding bars 2 are fixed to the pair of end plates 4. Binding bar 2 is formed in a plate shape extending in the battery stacking direction of battery stack 10. Specifically, binding bar 2 includes: fastening main surface 25 having a flat plate shape and covering a side surface of battery stack 10; and a first bent portion, a second bent portion, a third bent portion, and a fourth bent portion formed by bending end edges of fastening main surface 25 as bent portions. The first bent portion is one of the end edges of fastening main surface 25 extending in a longitudinal direction. In this exemplary embodiment, the first bent portion is upper end bent portion 21 formed by bending an upper end side of fastening main surface 25. The second bent portion is the other of the end edges of fastening main surface 25 extending in the longitudinal direction. In this exemplary embodiment, the second bent portion is lower end bent portion 22 formed by bending a lower end side of fastening main surface 25. The third bent portion is an end edge of fastening main surface 25 which intersects with the longitudinal direction. In this exemplary embodiment, the third bent portion is end plate fixing portion 23 which is formed by partially bending a front side of fastening main surface 25. Lastly, the fourth bent portion is an end edge of fastening main surface 25 which intersects with the longitudinal direction. In this exemplary embodiment, the fourth bent portion is end plate fixing portion 24 which is formed by partially bending a rear side of fastening main surface 25. By bending the respective end edges of binding bar 2 in this manner, both a cross-sectional shape of binding bar 2 in the longitudinal direction and a cross-sectional shape of binding bar 2 which intersects with the longitudinal direction are formed in a U shape. Accordingly, the rigidity of binding bar 2 can be increased.

Binding bar 2 is fixed to end plate 4 by screwing or the like. A corner of an upper surface of battery stack 10 is partially covered with upper end bent portion 21, and a corner of a lower surface of battery stack 10 is partially covered with lower end bent portion 22. Accordingly, battery cell 1 can be disposed at a fixed position. Lower plate 16 is disposed inside lower bent portion 22, and lower bent portion 22 is disposed on a bottom surface of battery stack 10. Heat conductive sheet 17 is disposed between lower plate 16 and heat radiation surface 1X of the bottom surface of the battery stack. Heat conductive sheet 17 provides insulation between a bottom surface of battery cell 1 and lower plate 16. Further, heat conductive sheet 17 is brought into close contact with heat radiation surface 1X of a bottom surfaces of the battery cells and lower plate 16 and hence, both members are brought into contact with each other in a favorable state. Lower end bent portion 22 fixes lower plate 16 in a state where lower plate 16 is pressed to heat radiation surface 1X on the bottom surface of the battery stack, and lower end bent portion 22 allows lower plate 16 to press heat conductive sheet 17 to heat radiation surfaces 1X of battery cells 1.

Such binding bar 2 is manufactured by bending a metal plate. Binding bars 2 need to have a sufficient strength to sandwich battery stack 10 for a long period of time. For this purpose, high tensile strength steel, general steel, stainless steel, an aluminum alloy, a magnesium alloy, and the like that are excellent in rigidity and heat transfer, or a combination of these materials can be used. In the example illustrated in FIG. 2, for example, a binding bar made of Fe-based metal is used.

The position where binding bars 2 are disposed may be side surfaces of battery stack 10, or may be upper and lower surfaces of battery stack 10. Further, the structure for fixing binding bar 2 to end plate 4 is not limited to screwing. A known fixing structure such as riveting, crimping, welding, or bonding can be appropriately used. As illustrated in FIG. 2, to enable the supply of a cooling gaseous body between battery cells 1, opening portions 25a may be formed in fastening main surface 25 of the binding bar. Further, binding bar 2 can be made light by forming a plurality of opening portions 25a in binding bar 2. With the use of binding bar 2 having opening portions 25a, air can be supplied to opening portions 25a. Accordingly, the battery cells can be cooled by forcible supplying air between battery cells 1 of battery stack 10.

Binding bar 2 made of metal can also include an insulating structure that is disposed between binding bar 2 and battery stack 10 in order to prevent short circuiting between binding bar 2 and the exterior can of battery cell 1. In the example illustrated in FIG. 2, insulator 9 is interposed between binding bar 2 made of metal and battery stack 10. insulator 9 is made of a material having insulating property such as a resin sheet or paper. Insulator 9 has substantially the same shape as binding bar 2 so as to prevent a side surface of battery stack 10 and binding bar 2 from being brought into contact with each other. Further, in the example illustrated in FIG. 2, opening region 9a is formed in insulator 9 so as to prevent insulator 9 from closing opening portions 25a formed in binding bar 2.

(Intermediate Plate 3)

In battery stack 10 illustrated in FIG. 1 and FIG. 2, intermediate plate 3 is stacked on an intermediate portion of battery stack 10. One intermediate plate 3 is disposed at a center portion of battery stack 10 illustrated in FIG. 2. However, in a case where battery stack 10 is an elongated battery stack, a plurality of intermediate plates may be disposed in the middle of the elongated battery stack. Intermediate plate 3 may not be used depending on the length of the battery stack. Intermediate plate 3 is fixed to binding bar 2. Therefore, binding bar 2 has intermediate plate fixing portion 27 for fixing binding bar 2 to intermediate plate 3 in the middle portion in the longitudinal direction. On the other hand, as illustrated in FIG. 3, metal collars 31 that are fixed to intermediate plate fixing portion 27 are fixed to intermediate plate 3. In a case where the battery stack has sufficient rigidity, it is also possible not to use the intermediate plate as described above.

The position where intermediate plate 3 is disposed on binding bar 2 is preferably substantially the center of binding bar 2 in the longitudinal direction. However, it is not hindered that the intermediate plate is disposed and fixed at a position slightly displaced toward either side in the longitudinal direction from the center of binding bar 2. In particular, it is possible to arrange the intermediate plate at the center of binding bar 2 when the number of battery cells to be stacked is an even number, it is difficult to arrange the intermediate plate at the center of binding bar 2 when the number of battery cells is an odd number. The present invention is suitably applicable to such configurations.

A perspective view of intermediate plate 3 is illustrated in FIG. 3. Intermediate plate 3 is preferably made of insulating plastic. However, it is not necessary to form the entirety of the intermediate plate using plastic. For example, although not illustrated, both side portions and upper and lower portions of a quadrangular portion, that is, an outer peripheral portion of the intermediate plate, and both surfaces of the intermediate plate may be made of plastic, and other portions of the intermediate plate may be made of metal. The intermediate plate may have a structure where the intermediate plate can be manufactured by insert-molding a metal plate into plastic so that surfaces of the intermediate plate are insulated by plastic. Intermediate plate 3 described above can be insulated from battery cells 1 stacked on both surfaces of intermediate plate 3 with certainty. As a resin material for molding the intermediate plate, for example, crystalline polymer (LCP), polyphenylene sulfide (PPS), polyether sulfone (PES), polybutylene terephthalate (PBT), polyamideimide (PAI), polyphthalamide (PPA), polyether ether ketone (PEEK), polycarbonate, and the like can be used.

(Lower Plate 16)

In each of power supply devices 100, 200, 300, and 400 illustrated in FIG. 2, FIG. 4, FIG. 6, FIG. 8, and FIG. 10, lower plate 16 is fixed to heat radiation surfaces 1X (bottom surfaces in the drawing) of respective battery cells 1 which form battery stack 10 in a contact state by way of heat conductive sheet 17 in order to radiate heat energy of respective battery cells 1. Lower plate 16 is fixed to a bottom surface of battery stack 10, that is, heat radiation surfaces 1X of respective battery cells 1 by way of binding bar 2. Lower plate 16 illustrated in FIG. 4 and FIG. 6 can radiate heat energy of battery cells 1 by forming heat radiation fins (not illustrated) on a lower surface of lower plate 16 in the drawing. Lower plate 16 can cool battery cells 1 more effectively by forcibly supplying air to the heat radiation fins.

Figure 8:
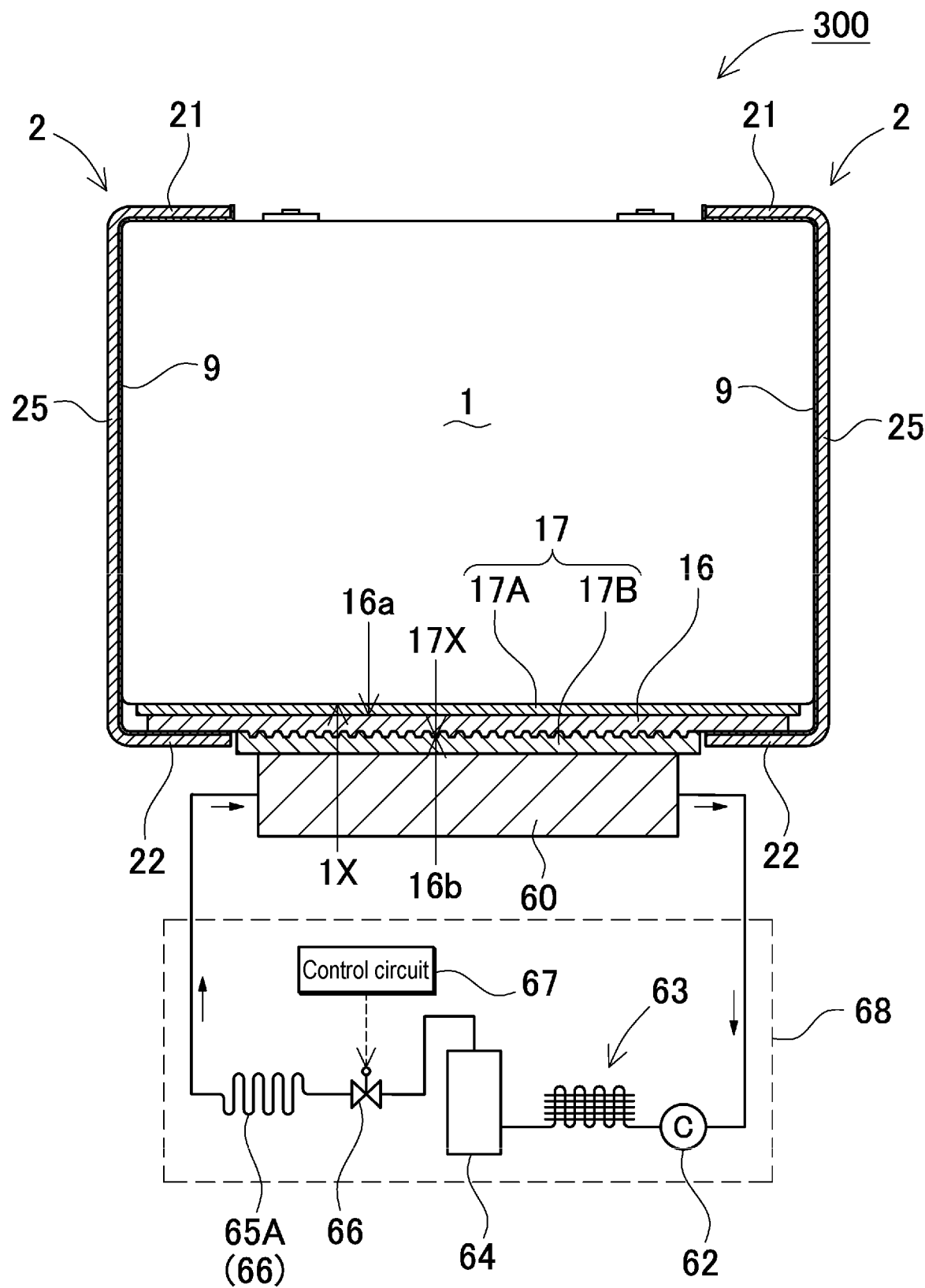
FIG. 8 is a schematic cross-sectional view of a power supply device according to another exemplary embodiment of the present invention.
Figure 10:
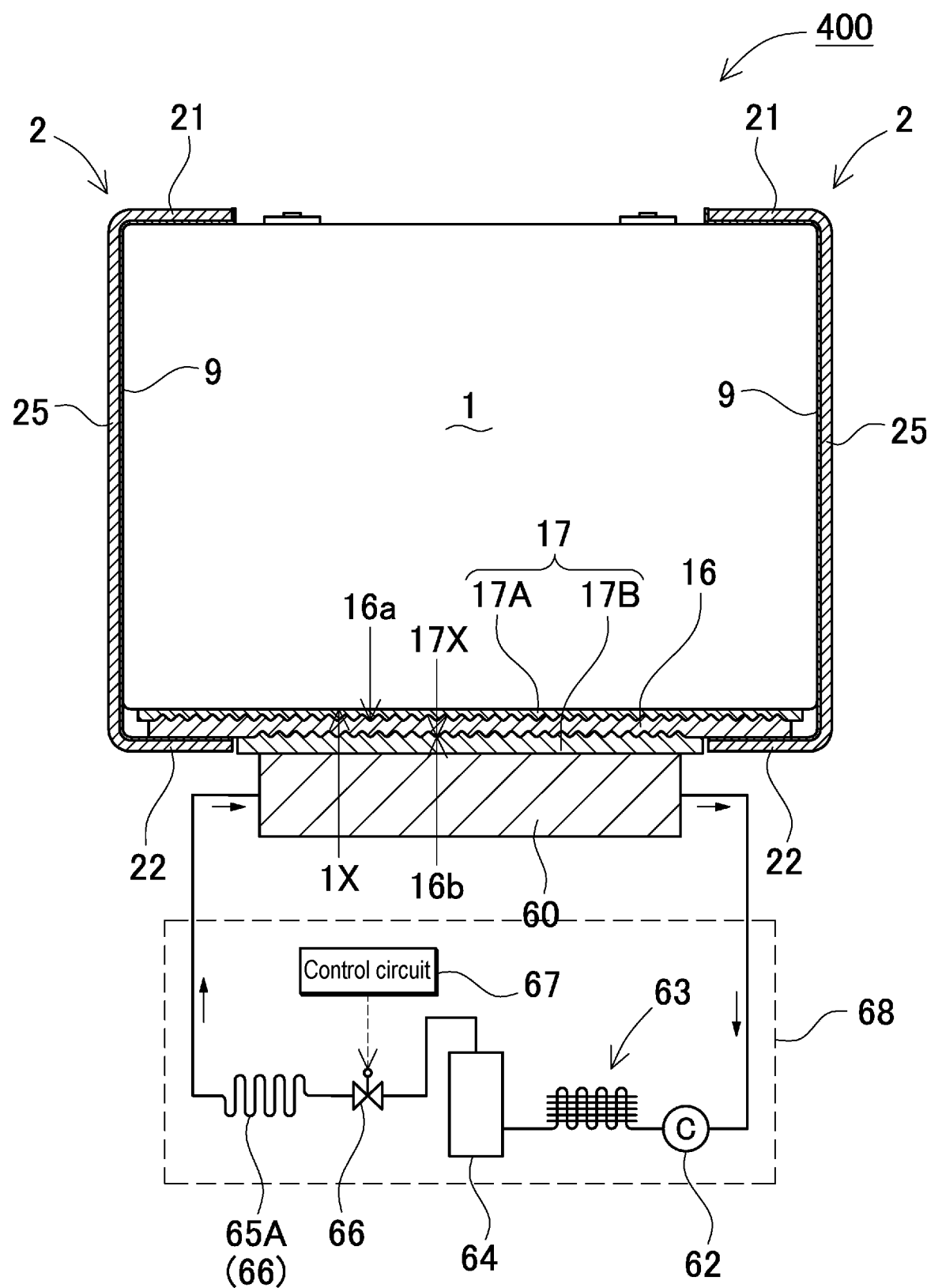
FIG. 10 is a schematic cross-sectional view of a power supply device according to another exemplary embodiment of the present invention.

In power supply devices 300 and 400 illustrated in FIG. 8 and FIG. 10, cooling block 60 is brought into contact with a lower surface of lower plate 16 so that lower plate 16 is cooled by cooling block 60. These power supply devices 300 and 400 can effectively cool battery cells 1 by cooling lower plate 16 with cooling block 60.

In power supply devices 300, 400 illustrated in FIG. 8 and FIG. 10, in the drawings, first heat conductive sheet 17A is stacked between contact surface 16a that is an upper surface of lower plate 16 on an inner side and battery stack 10, and second heat conductive sheet 17B is stacked between contact surface 16b that is a lower surface of lower plate 16 on an outer side and cooling block 60. First heat conductive sheet 17A transfers heat energy of battery cells 1 to lower plate 16, and second heat conductive sheet 17B transfers heat energy of lower plate 16 to cooling block 60. First heat conductive sheet 17A provides electric insulation between battery cell 1 and lower plate 16. However, it is not necessary for second heat conductive sheet 17B to provide electric insulation between lower plate 16 and cooling block 60. Accordingly, heat can be efficiently transferred using the electric conductive and heat conductive sheets.

Figure 5A:
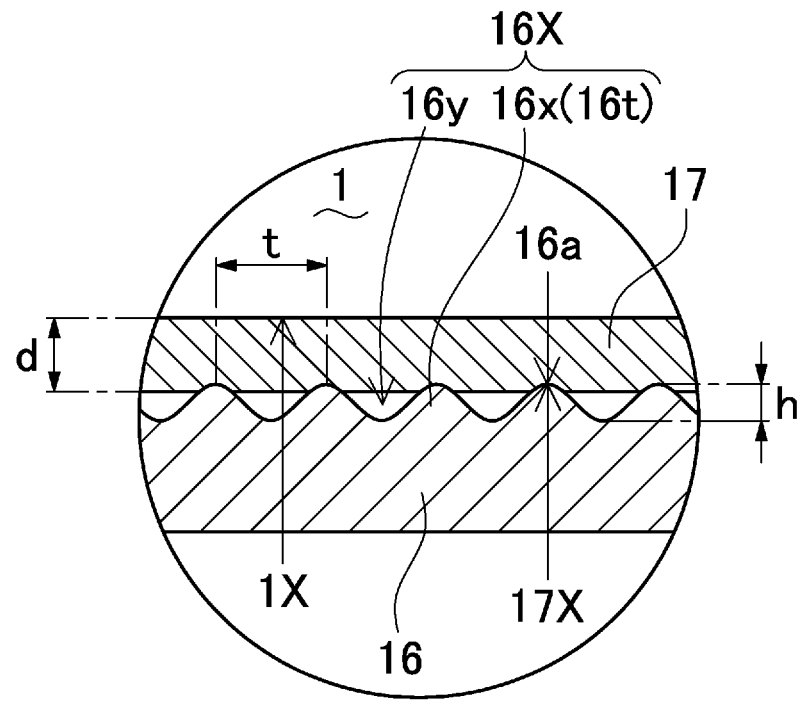
FIG. 5A and FIG. 5B are an enlarged cross-sectional view of a main part of the power supply device illustrated in FIG. 4.
Figure 5B:
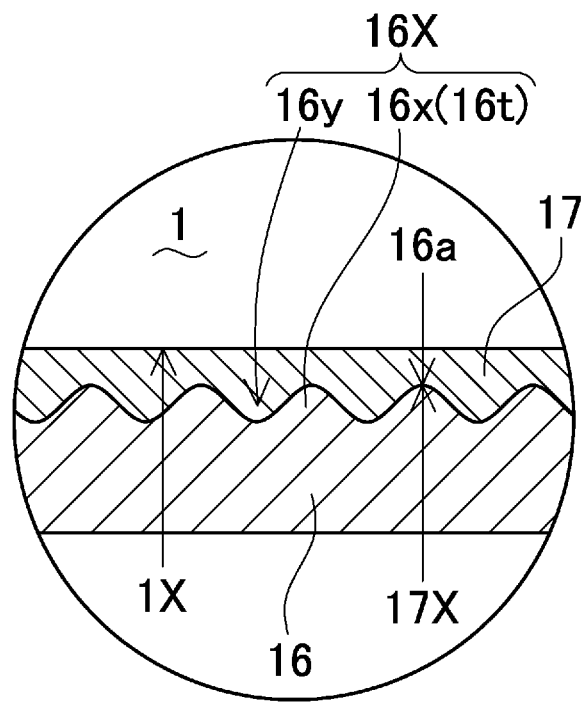
Figure 7A:
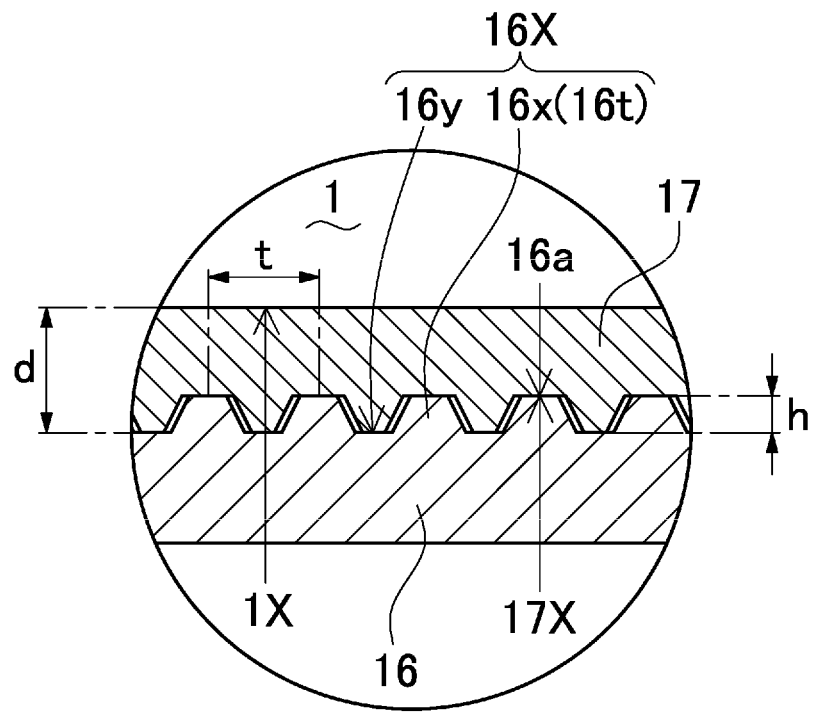
Figure 7B:
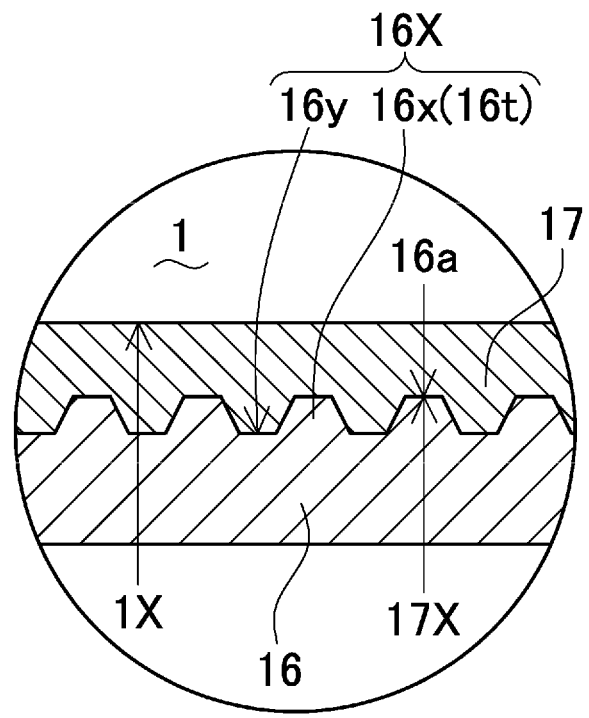
Figure 9:
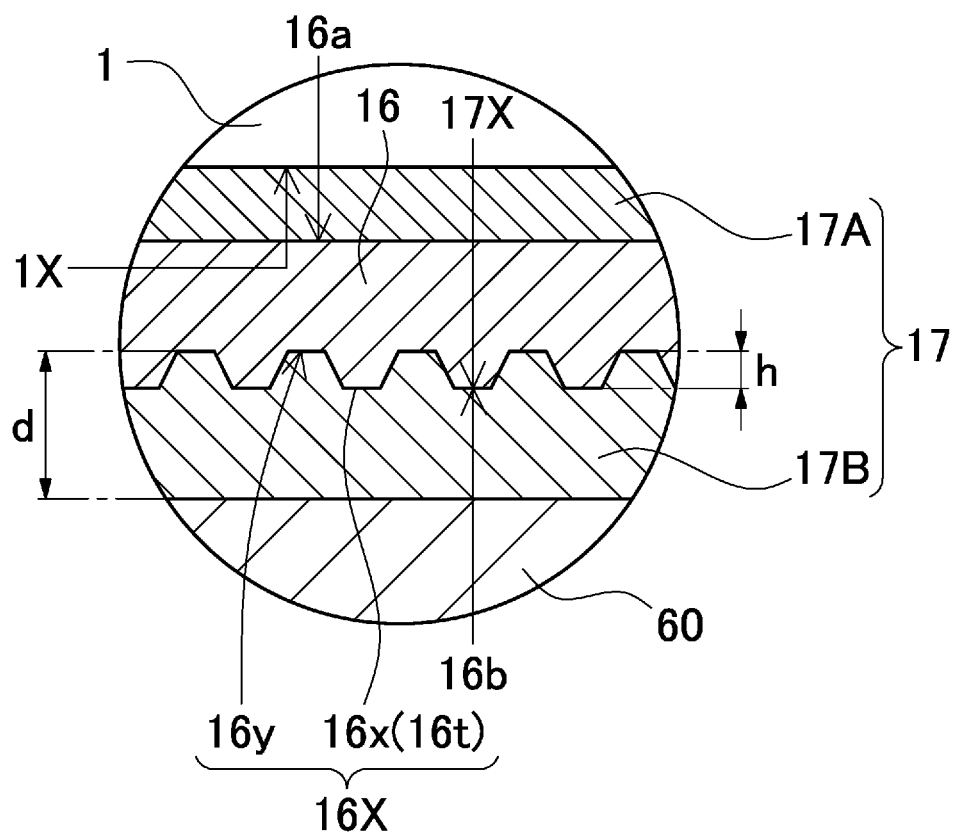
FIG. 9 is an enlarged cross-sectional view of a main part of the power supply device illustrated in FIG. 8.
Figure 11:
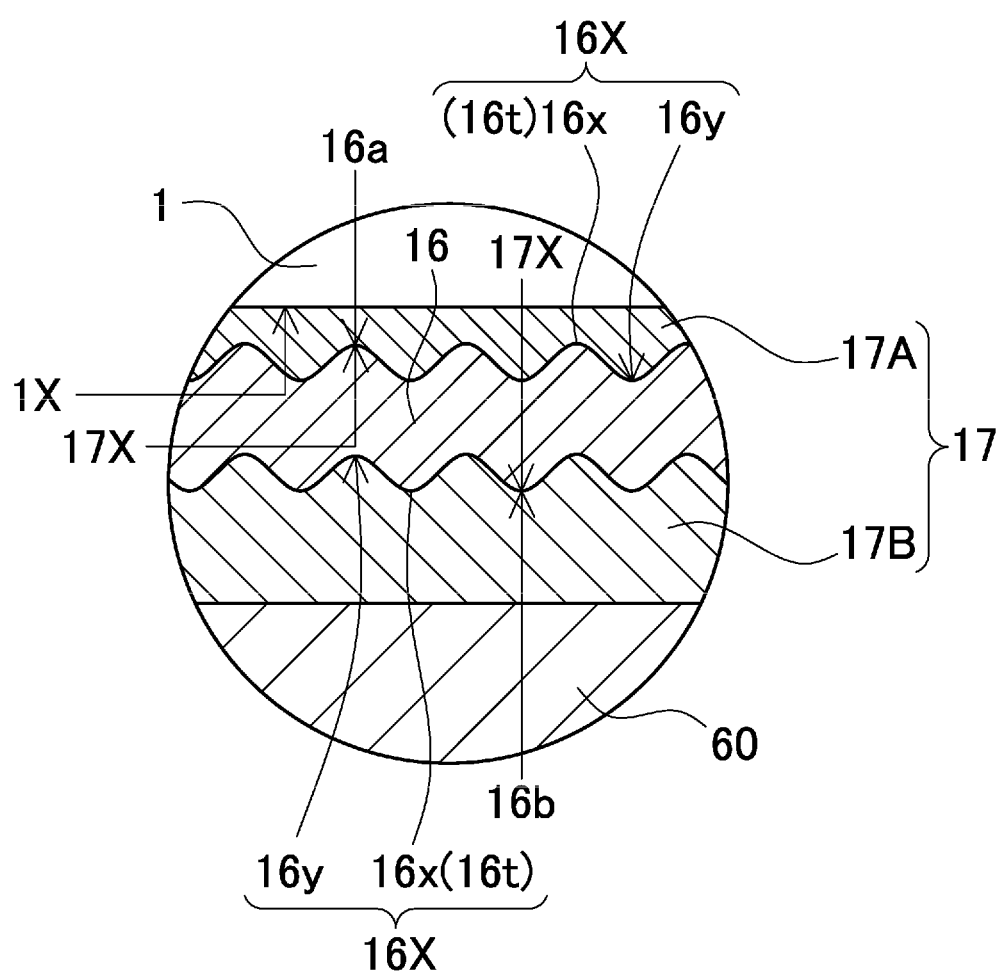
FIG. 11 is an enlarged cross-sectional view of a main part of the power supply device illustrated in FIG. 10.

As illustrated in FIG. 5A. FIG. 5B, FIG. 7A. FIG. 7B, FIG. 9, and FIG. 11, contact surface 16a of lower plate 16 that is brought into contact with heat conductive sheet 17 is formed of a regular uneven surface 16X. When heat conductive sheet 17 is stacked on uneven surface 16X in a pressed state, heat conductive surface 17X of heat conductive sheet 17 is deformed into a concave shape along the unevenness of uneven surface 16X. Accordingly, heat conductive sheet 17 and lower plate 16 are stacked on each other in a favorable contact state.

Figure 4:
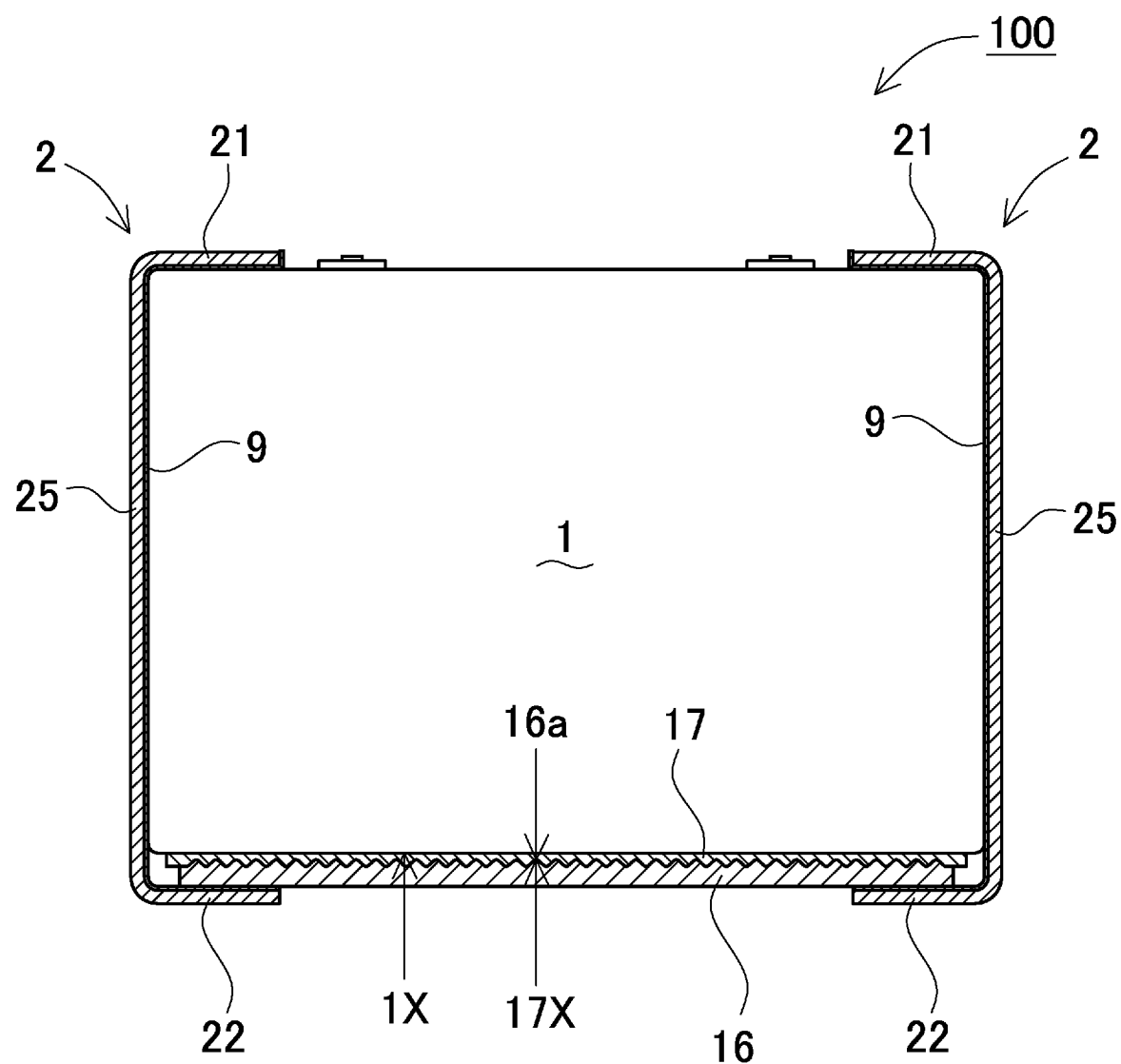
FIG. 4 is a schematic cross-sectional view of a power supply device according to the exemplary embodiment of the present invention.
Figure 6:
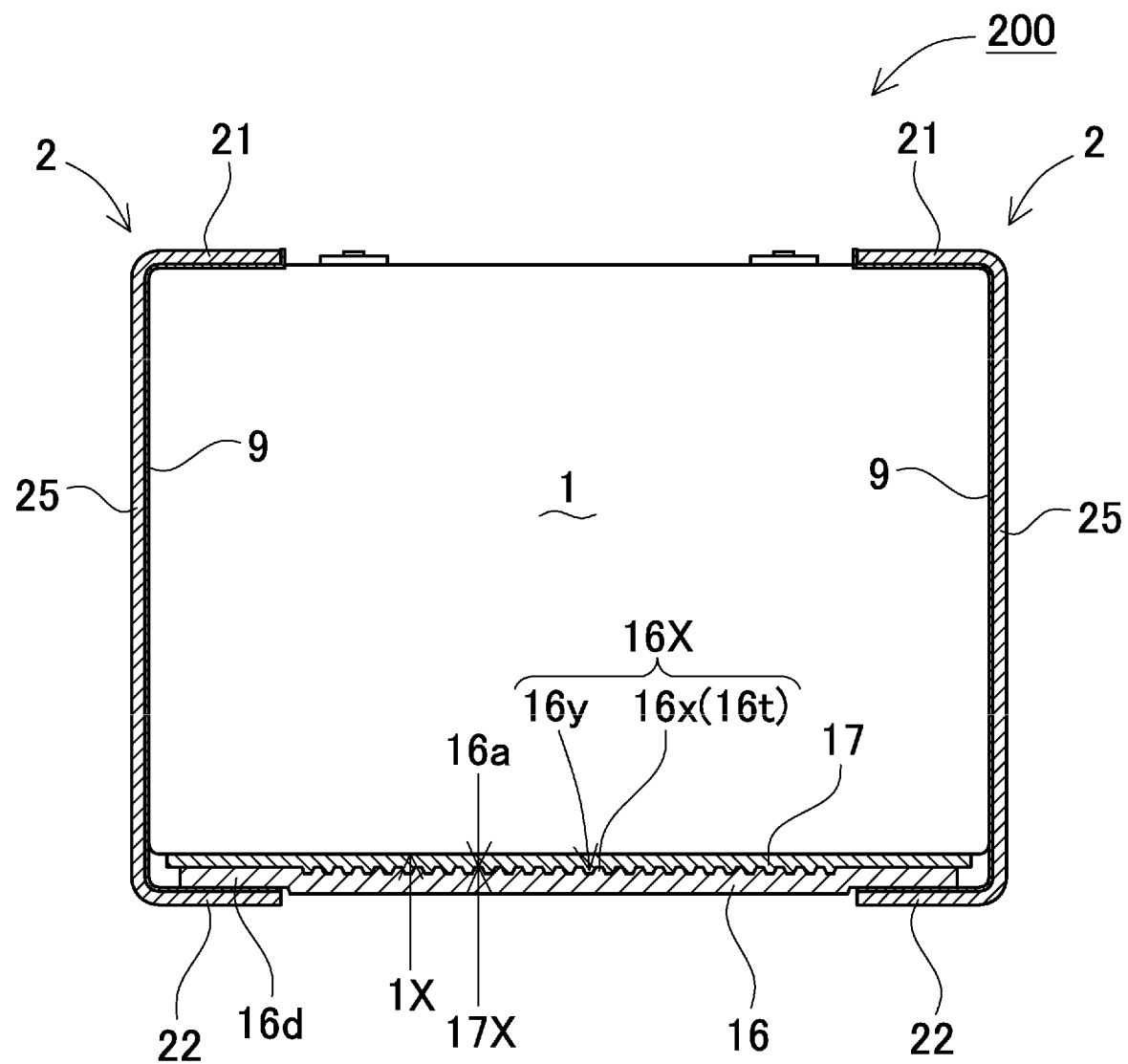
FIG. 6 is a schematic cross-sectional view of a power supply device according to another exemplary embodiment of the present invention.

As illustrated in the enlarged cross-sectional view of the main part in FIG. 5A, and FIG. 5B, FIG. 7A and FIG. 7B, lower plate 16 illustrated in FIG. 4 and FIG. 6 is brought into contact with heat conductive sheet 17 in a favorable state where contact surface 16a that forms an inner surface is formed of uneven surface 16X, and heat conductive sheet 17 is stacked on contact surface 16a on the inner side. In lower plate 16 illustrated in FIG. 8, first heat conductive sheet 17A is stacked on contact surface 16a on the inner side, second heat conductive sheet 17B is stacked on contact surface 16b on the outer side, and contact surface 16b on the outer side is formed of uneven surface 16X. In lower plate 16 illustrated in FIG. 10, first heat conductive sheet 17A is stacked on contact surface 16a on the inner side, second heat conductive sheet 17B is stacked on contact surface 16b on the outer side, and both of contact surface 16a on the inner side and contact surface 16b on the outer side are formed of uneven surface 16X.

Uneven surface 16X of lower plate 16 is brought into contact with heat conductive sheet 17 with a wide contact area so that a favorable contact state is achieved. Each of the enlarged cross-sectional views in FIG. 5A, FIG. 5B, and FIG. 7A and FIG. 7B illustrates a state where a gap between heat radiation surface 1X of battery cell 1 and lower plate 16 is wide, and a state where the gap between heat radiation surface 1X of battery cell 1 and lower plate 16 is narrow. The enlarged cross-sectional views in FIG. 5A and FIG. 7A illustrate the state where the gap is wide, and the enlarged cross-sectional views in FIG. 5B and FIG. 7B illustrate the state where the gap is narrow. In the state where the gap is wide, protruding portions 16t of uneven surface 16X are brought into contact with heat conductive sheet 17. In the case where the gap is narrow, the entire surface of uneven surface 16X is brought into contact with heat conductive sheet 17. Although not illustrated, in the lower plate having a planar contact surface, in a case where the gap is wide, the heat conductive sheet is brought into a state where the heat conductive sheet is not brought into contact with the surface of the lower plate. As a result, an air layer is formed between the heat conductive sheet and the lower plate and hence, heat transfer is significantly lowered. In lower plate 16 having contact surface 16a which is formed of uneven surface 16X, as illustrated in the enlarged cross-sectional views in FIG. 5A, FIG. 5B, and FIG. 7A and FIG. 7B, even in a state where the gap between lower plate 16 and heat conductive sheet 17 is wide, protruding portions 16t of uneven surface 16X are partially brought into contact with and conduct heat. Accordingly, the heat transfer between heat conductive sheet 17 and lower plate 16 is maintained in a favorable state.

In actual assembly steps of power supply device, it is extremely difficult to constantly maintain the gap between heat conductive sheet 17 and lower plate 16 at a fixed value for a long period of time. On the other hand, a partial imbalance in gap brings about worsening of a contact state. In particular, in battery stack 10 formed by stacking the plurality of battery cells 1 to each other, it is extremely difficult to make heat radiation surfaces 1X of the bottom surfaces of battery cells 1 completely planar. As a result, a gap between heat conductive sheet 17 stacked on the bottom surface of battery stack 10 and lower plate 16 becomes non-uniform. The non-uniformity of the gap becomes a factor that generates an air layer between heat conductive sheet 17 and lower plate 16 in a region where the gap is wide. Air has extremely low thermal conductivity and hence, the air layer significantly hinders heat transfer between heat conductive sheet 17 and lower plate 16. When the structure is adopted where heat conductive sheet 17 cannot uniformly conduct heat energy of battery cells 1 to lower plate 16, such structure hinders uniform cooling of battery cells 1, and significantly degrades battery cells 1 whose temperature rises. In particular, in the power supply device formed by stacking a large number of battery cells 1, the battery cells 1 are connected in series and hence, the deterioration of a specific battery cell deteriorates performance of the entire power supply device. Furthermore, the temperature rise of a specific battery cell also becomes a factor that hinders the safety of the power supply device.

In the power supply device that achieves a state where uneven surface 16X of lower plate 16 is brought into contact with heat conductive sheet 17 in a favorable state, respective battery cells 1 are uniformly efficiently cooled thus reducing a temperature difference between respective battery cells. Accordingly, the degradation of the specific battery cell is prevented, and the reliability of the entire device is improved. Further, the abnormal temperature rise of a specific battery cell is suppressed and hence, the power supply device can ensure high safety.

Lower plate 16 is manufactured using a metal plate having excellent heat transfer, preferably a metal plate such as an aluminum plate. This is because such a metal plate can achieve a favorable contact between lower plate 16 and heat conductive sheet 17 and can uniformly cool respective battery cells 1 to reduce a temperature difference between battery cells 1. A thickness of lower plate 16 is preferably set to a value which falls within a range from 1 mm to 5 mm inclusive. In a case where the further reduction of weight of lower plate 16 is required, by setting the thickness of lower plate 16 to less than or equal to 3 mm, lower plate 16 can uniformly and efficiently absorb heat energy of battery cells 1 by way of heat conductive sheet 17.

By increasing height (h) of the unevenness of uneven surface 16X of lower plate 16, lower plate 16 can be brought into contact with heat conductive sheet 17 with a wider gap. Accordingly, for example, height (h) of unevenness of uneven surface 16X is set to a value which falls within a range from 10% to 80% inclusive of thickness (d) of heat conductive sheet 17. Height (h) of unevenness of uneven surface 16X is more preferably set to a range from 20% to 70% inclusive of thickness (d) of heat conductive sheet 17. Height (h) of unevenness of uneven surface 16X is optimally set to about 50% of thickness (d) of heat conductive sheet 17. When height (h) of uneven surface 16X is small, heat conductive sheet 17 and lower plate 16 cannot be brought into contact with each other in a region where the gap is wide. On the other hand, when height (h) is too large, heat conductive sheet 17 may be broken. In view of the above, height (h) of the unevenness of uneven surface 16X of lower plate 16 is set to an optimum value within the above-described range in consideration of thickness (d) and a material of heat conductive sheet 17 and a non-uniform state of the gap. Pitch (t) of the unevenness is set to, for example, a range from ½ to 5 times inclusive of height (h) of uneven surface 16X. Preferably pitch (t) of the unevenness is set to 3 times or less of height (h) of uneven surface 16X.

In lower plate 16 illustrated in FIGS. 4 to 11, grooves 16y are formed between a plurality of rows of protruding ridges 16x arranged in parallel, and a cross-sectional shape of uneven surface 16X is formed of a waveform. In lower plate 16 illustrated in FIG. 5A, FIG. 5B and FIG. 11, the cross-sectional shape of uneven surface 16X is formed of a sine-wave shape. In lower plate 16 illustrated in FIG. 7A, FIG. 7B and FIG. 9, the cross-sectional shape of uneven surface 16X is formed of a trapezoidal wave shape. A plurality of rows of protruding ridges 16x and grooves 16y extending in the thickness of battery cell 1 are alternately arranged. Uneven surface 16X having a sine-wave cross-sectional shape has a curved surface at a distal end portion of protruding ridge 16x that forms protruding portion 16t. Uneven surface 16X having a trapezoidal cross-sectional shape has a flat surface at a distal end portion of protruding ridge 16x which forms protruding portion 16t. As illustrated in the enlarged cross-sectional views in FIG. 5A, FIG. 5B, FIG. 7A, FIG. 7B, FIG. 9, and FIG. 11, protruding portion 16t where the distal end portion has a curved shape or a flat plate shape is brought into contact with heat conductive surface 17X of heat conductive sheet 17 over a wide area, and does not break heat conductive sheet 17 even when protruding portion 16t intrudes into heat conductive sheet 17X. Accordingly, protruding portions 16t have a characteristic that height (h) of uneven surface 16X is increased so that lower plate 16 and heat conductive sheet 17 can be brought into contact with each other in a more favorable state.

In battery stack 10 formed by stacking a large number of battery cells 1, heat radiation surfaces 1X form an elongated rectangular shape in the stacking direction. Accordingly, lower plate 16 that is stacked on heat radiation surfaces 1X also has an elongated rectangular shape. Lower plate 16 having such a profile where uneven surface 16X is formed in an uneven shape by protruding ridges 16x and grooves 16y extending in the longitudinal direction of the rectangular shape can be manufactured efficiently on a mass production basis. This is because lower plate 16 can be manufactured efficiently by extrusion molding using aluminum as a material. Lower plate 16 is disposed in a posture where protruding ridges 16x and grooves 16y extend in a thickness of heat radiation surface 1X of battery cell 1. The protruding ridges and the grooves may be formed on the uneven surface of the lower plate in a posture where the protruding ridges and grooves extend in the longitudinal direction of the heat radiation surfaces of the battery cells. In other words, the protruding ridges and the grooves may be formed such that the protruding ridges and the grooves extend in the width of the battery stack. Further, the protruding ridges and the grooves may be formed on the uneven surface in a state where the protruding ridges and the grooves extend in both the width and the thickness of the heat radiation surfaces of the battery cells in a grid pattern.

Lower plate 16 illustrated in FIG. 4 has a plate shape as a whole, and is fixed to heat radiation surface 1X of the bottom surface of the battery stack by binding bars 2. Lower plate 16 illustrated in FIG. 6 has a shape where a step is formed on both sides of lower plate 16, lower end bent portions 22 of binding bars 2 are disposed on steps 16*d*, and lower plate 16 is disposed on heat radiation surface 1X of battery stack 10. In lower plate 16 illustrated in FIG. 8 and FIG. 10, cooling block 60 is disposed on a lower surface of lower plate 16 by way of second heat conductive sheet 17B.

(Heat Conductive Sheet 17)

Heat conductive sheet 17 is a flexible sheet that is, when pressed by uneven surface 16X of lower plate 16, deformed along the unevenness of uneven surface 16X. Heat conductive sheet 17 is a sheet excellent in heat transfer, and has a thickness ranging from 0.5 mm to 10 mm inclusive. Heat conductive sheet 17 is sandwiched between battery cell 1 and lower plate 16 in a collapsed state. Heat conductive sheet 17 is stacked in a state where one surface of heat conductive sheet 17 is brought into contact with contact surfaces 16*a*, 16*b* of lower plate 16 and the other surface of heat conductive sheet 17 is brought into contact with heat radiation surface 1X of battery cell 1 or cooling block 60. Lower plate 16 is brought into close contact with respective battery cells 1 by way of heat conductive sheet 17 in a contact state, and efficiently cools battery cells 1. Heat conductive sheet 17 may be formed of a sheet having excellent heat conductive characteristics. For example, a flexible sheet that is formed by bonding heat conductive particles made of alumina particles to each other using a binder can be used. A sheet such as a silicon resin sheet or the like is used. Furthermore, heat conductive sheet 17 can have a structure where a heat conductive paste such as silicon oil is applied to a surface of heat conductive sheet 17 by coating. Such heat conductive sheet 17 can conduct heat more efficiently.

In the power supply device where battery cells 1 which are disposed adjacently to each other are connected in series, there exists a potential difference between battery cells 1 which are disposed adjacently to each other. Accordingly, when battery cells 1 are electrically connected to lower plate 16 formed of a metal plate, short-circuiting occurs and a large short-circuiting current flows. This drawback can be eliminated by using an insulating sheet as heat conductive sheet 17. This is because heat conductive sheet 17 provides electric insulation between lower plate 16 and battery cells 1.

(Cooling Block 60)

A refrigerant passage (not illustrated) that allows a refrigerant to pass through the refrigerant passage is formed in cooling block 60 so that cooling block 60 can cool lower plate 16. Cooling mechanism 68 supplies a refrigerant to the refrigerant passage to cool cooling block 60. Cooling block 60 is cooled by heat of vaporization that is generated when a refrigerant such as Freon or a carbon dioxide gas supplied from cooling mechanism 68 is vaporized in the refrigerant passage in cooling block 60.

(Cooling Mechanism 68)

As illustrated in FIG. 8 and FIG. 10, cooling mechanism 68 that forcibly cools cooling block 60 with heat of vaporization of a refrigerant includes: compressor 62 that pressurizes a gaseous refrigerant discharged from cooling block 60; condenser 63 that cools and liquefies the refrigerant pressurized by compressor 62; receiver tank 64 that stores liquid liquefied by condenser 63; and expansion valve 65 formed of a flow rate control valve or capillary tube 65A that supplies the refrigerant in receiver tank 64 to cooling block 60. Cooling mechanism 68 supplies the liquefied refrigerant to cooling block 60 through expansion valve 65, vaporizes the supplied refrigerant in a refrigerant passage, and cools cooling block 60 with heat of vaporization.

Expansion valve 65 of cooling mechanism 68 illustrated in FIG. 8 and FIG. 10 is capillary tube 65A formed of a thin tube that throttles a flow rate of the refrigerant. Expansion valve 65 produces adiabatic expansion of the refrigerant by limiting a flow rate of the refrigerant to be supplied to the refrigerant passage. Expansion valve 65 of capillary tube 65A limits a supply amount of the refrigerant to an amount for completely vaporizing the refrigerant and discharging the refrigerant in a gaseous state in the refrigerant passage of cooling block 60. Condenser 63 cools and liquefies the gaseous refrigerant supplied from compressor 62. Condenser 63 liquefies the refrigerant by radiating heat of the refrigerant. Therefore, condenser 63 is disposed in front of a radiator disposed in a vehicle. Compressor 62 is driven by an engine of a vehicle or driven by a motor, and pressurizes the gaseous refrigerant discharged from the refrigerant passage, and supplies the pressurized refrigerant to condenser 63. In cooling mechanism 68, the refrigerant pressurized by compressor 62 is cooled and liquefied by condenser 63, the liquefied refrigerant is stored in receiver tank 64, the refrigerant in receiver tank 64 is supplied to cooling block 60, the refrigerant is vaporized in the refrigerant passage of cooling block 60, and cooling block 60 is cooled with heat of vaporization.

The compressor, the condenser, and the receiver tank for vehicle interior cooling that are mounted on a vehicle as cooling mechanism 68 described above can be also used as cooling mechanism 68 for the power supply device. With the provision of this structure, battery stack 10 of the power supply device mounted on the vehicle can be efficiently cooled without providing a dedicated cooling mechanism for cooling battery stack 10. In particular, cooling calories for cooling battery stack 10 are extremely smaller than cooling calories required for cooling the vehicle. Accordingly, even when the cooling mechanism for cooling the vehicle is used also for cooling of the battery stack, battery stack 10 can be effectively cooled substantially without causing lowering of the cooling capacity of the vehicle.

Cooling mechanism 68 further includes control circuit 67 that controls cooling of cooling block 60. Cooling mechanism 68 controls a cooling state of cooling block 60 by detecting temperatures of battery cells 1 using a temperature sensor (not illustrated). Control circuit 67 controls on-off valve 66 that connects an inflow side of cooling block 60 to receiver tank 64. On-off valve 66 is opened and closed by control circuit 67 so that the cooling state of cooling block 60 is controlled. When on-off valve 66 is opened, cooling block 60 is brought into a cooling state. When on-off valve 66 is opened, a refrigerant in receiver tank 64 is supplied to cooling block 60 through expansion valve 65. The refrigerant supplied to cooling block 60 is vaporized in cooling block 60, and cooling block 60 is cooled by heat of vaporization. The refrigerant vaporized by cooling cooling block 60 is sucked into compressor 62 and is circulated from condenser 63 to receiver tank 64. When on-off valve 66 is closed, the refrigerant is not circulated into cooling block 60 so that cooling block 60 is brought into a non-cooling state. In cooling mechanism 68, when the temperature of battery cell 1 becomes higher than a preset cooling start temperature, a refrigerant is supplied to cooling block 60 so as to cool battery cell 1. On the other hand, when the temperature of battery cell 1 becomes lower than a cooling stop temperature, the supply of the refrigerant to cooling block 60 is stopped so as to control battery cell 1 in a preset temperature range.

In cooling block 60 described above, cooling block 60 is cooled to a low temperature using the heat of vaporization of the refrigerant. However, the cooling block can be cooled without using the heat of vaporization. In such a cooling block, a refrigerant such as brine cooled at a low temperature is supplied to the refrigerant passage, and the cooling block is cooled directly by the low-temperature refrigerant without using heat of vaporization of the refrigerant. The cooling mechanism that circulates brine as a refrigerant may be configured to cool the brine by heat of vaporization of the refrigerant. In particular, in a power supply device mounted on a vehicle, an existing cooling mechanism used for vehicle interior cooling can be used for cooling brine.

The power supply device described above can be used as a power supply for a vehicle where electric power is supplied to a motor used for traveling an electric vehicle. As an electric vehicle on which the power supply device is mounted, an electric vehicle such as a hybrid automobile or a plug-in hybrid automobile that travels by both an engine and a motor, or an electric automobile that travels only by a motor can be used, and the power supply device is used as a power supply for these vehicles. In order to obtain electric power that drives a vehicle, a large-capacity, high-output power supply device may be assembled by connecting a large number of above-described power supply devices in series or in parallel, a required control circuit is added to such large-capacity, high-output power supply device, and such a power supply device may be mounted on a vehicle.

(Power Supply Device for Hybrid Automobile)

Figure 12:
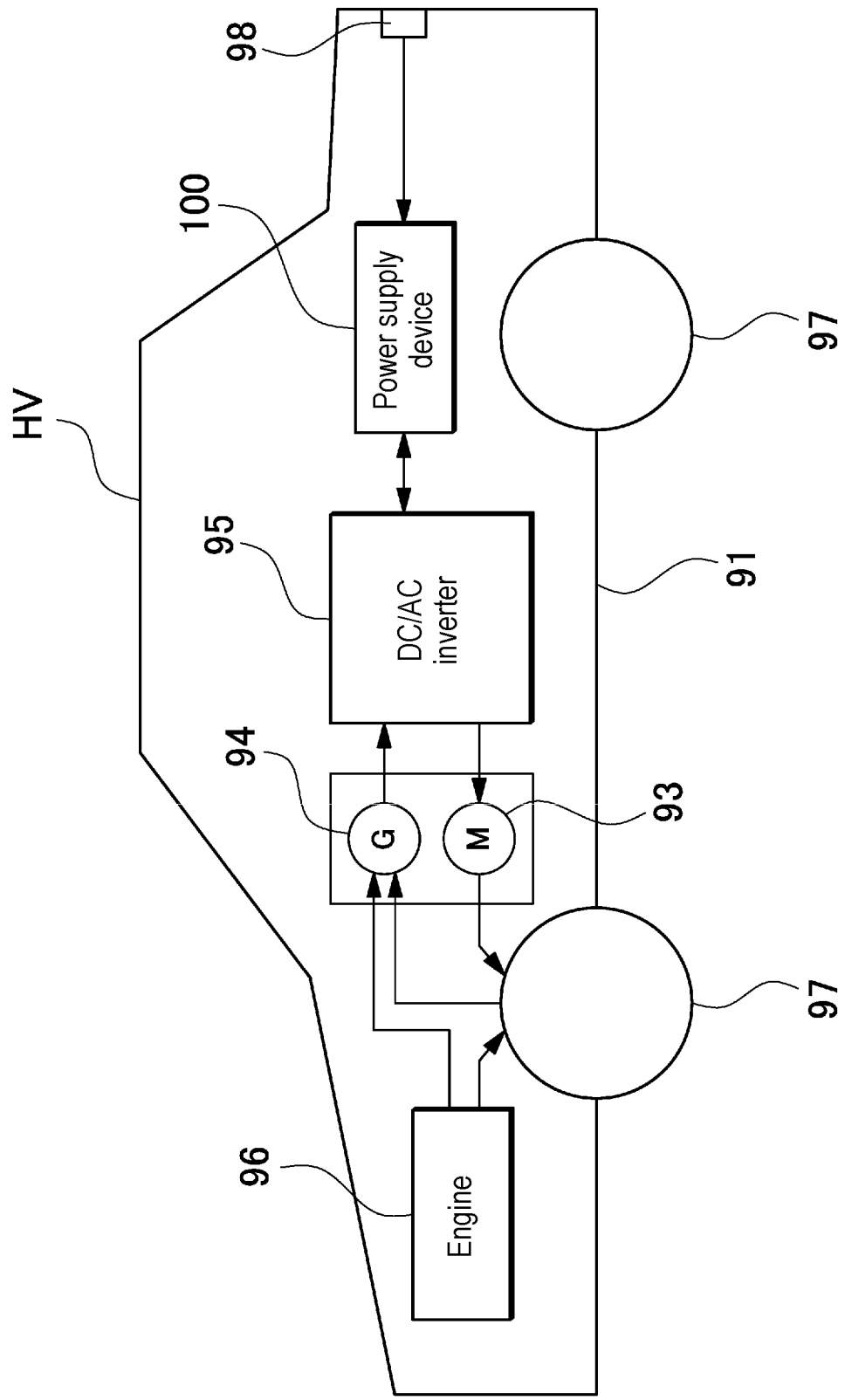
FIG. 12 is a block diagram illustrating an example of a power supply device mounted in a hybrid automobile that travels by an engine and a motor.

FIG. 12 illustrates an example of a power supply device mounted on a hybrid automobile that travels by both an engine and a motor. Vehicle HV illustrated in the drawing on which the power supply device is mounted includes: vehicle body 91; engine 96 and motor 93 for traveling of vehicle body 91; wheels 97 that are driven by engine 96 and motor 93 for traveling; power supply device 100 that supplies electric power to motor 93; and power generator 94 that charges batteries of power supply device 100. Power supply device 100 is connected to motor 93 and power generator 94 via DC/AC inverter 95. Vehicle HV travels by both motor 93 and engine 96 while charging or discharging the batteries of power supply device 100. Motor 93 is driven in a region where an engine efficiency is low, for example, during acceleration or low-speed traveling, and causes the vehicle to travel in the region. Motor 93 is driven by electric power supplied from power supply device 100. Power generator 94 is driven by engine 96 or driven by regenerative braking acquired when braking is applied to a vehicle, and charges the batteries of power supply device 100. As illustrated in the drawing, vehicle HV may include charging plug 98 to charge power supply device 100. Power supply device 100 can be charged by connecting charging plug 98 to an external power supply.

(Power Supply Device for Electric Automobile)

Figure 13:
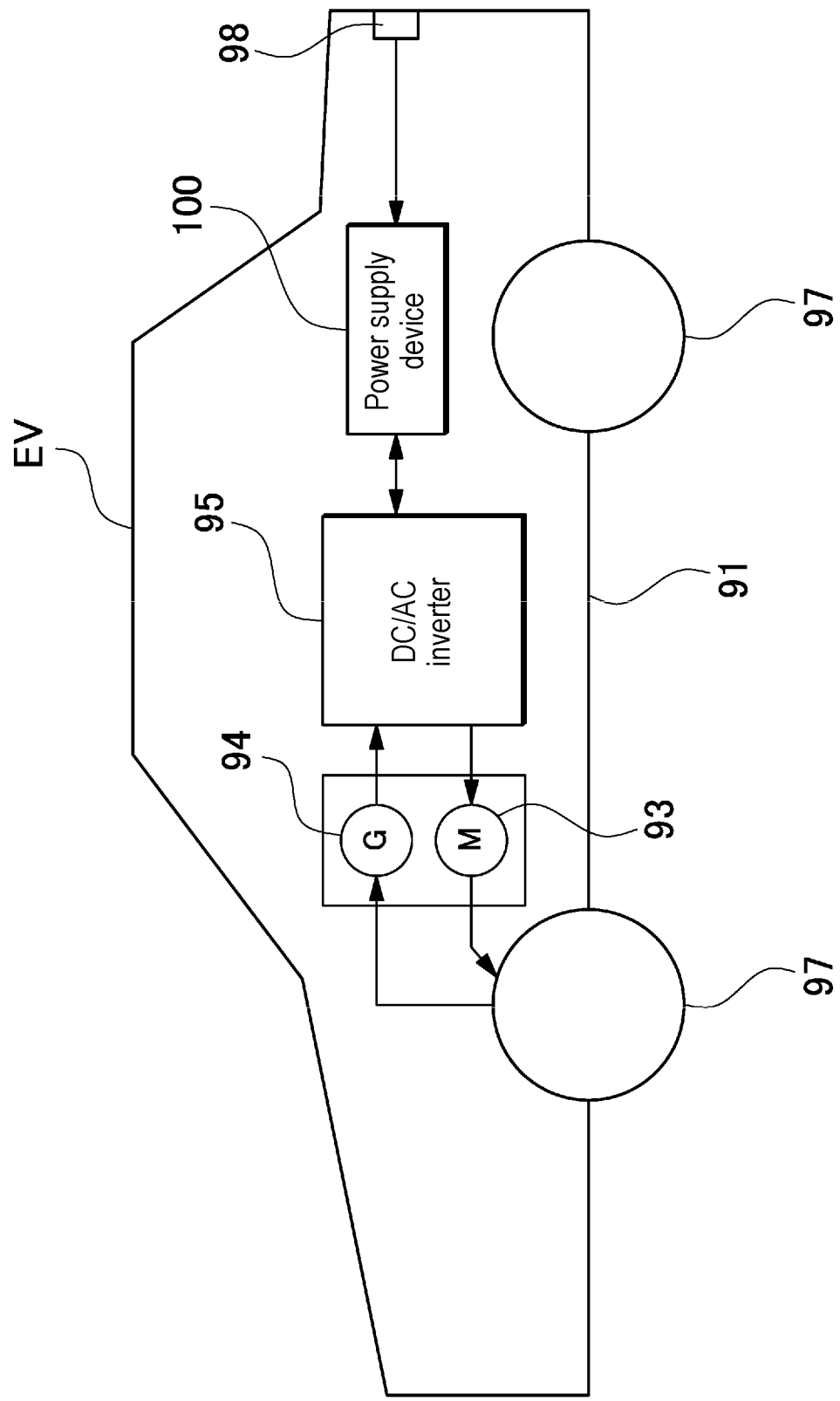
FIG. 13 is a block diagram illustrating an example of a power supply device mounted in an electric vehicle that travels only by a motor.

FIG. 13 illustrates an example of a power supply device mounted on an electric automobile that travels only by a motor. Vehicle EV illustrated in FIG. 13 on which the power supply device is mounted includes: vehicle body 91; motor 93 for travelling vehicle body 91; wheels 97 driven by motor 93 for vehicle traveling; power supply device 100 that supplies electric power to motor 93; and power generator 94 that charges batteries of power supply device 100. Power supply device 100 is connected to motor 93 and power generator 94 via DC/AC inverter 95. Motor 93 is driven by electric power supplied from power supply device 100. Power generator 94 is driven by energy generated at the time of applying regenerative braking to vehicle EV, and charges batteries of power supply device 100. Vehicle EV further includes charging plug 98, and power supply device 100 can be charged by connecting charging plug 98 to an external power supply.

(Power Supply Device for Power Storage Device)

Figure 14:
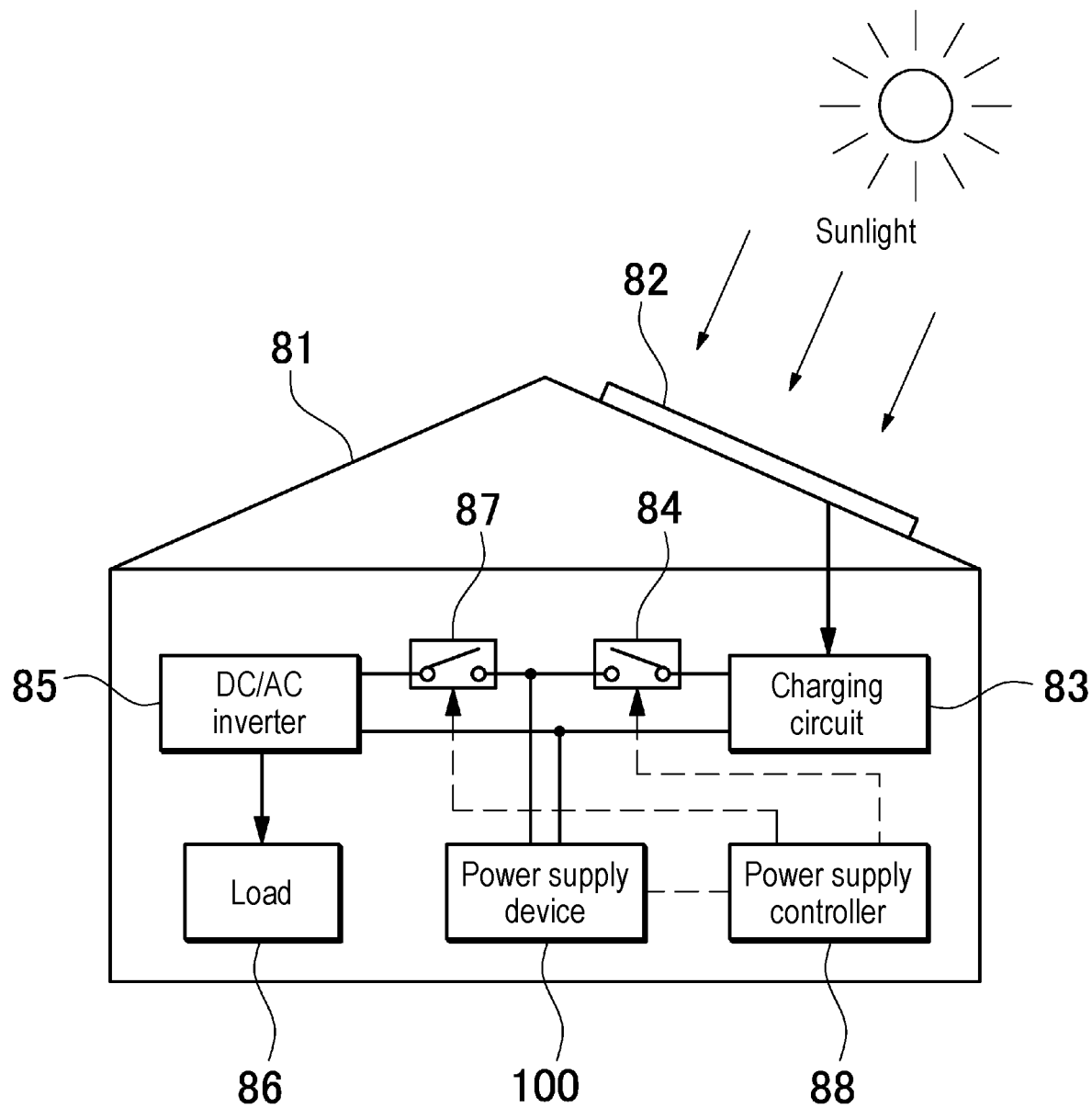
FIG. 14 is a block diagram illustrating an example where the power supply device is applied as a power supply device for power storage.

Further, the application of the power supply device of the present invention is not limited to a power supply for a motor for vehicle traveling. The power supply device according to the exemplary embodiment can be used as a power supply for a power storage device that stores electricity by charging a battery with electric power generated by photovoltaic power generation, wind power generation, or other methods. FIG. 14 illustrates a power storage device that stores electricity by charging batteries in power supply device 100 by solar battery 82.

The power storage device illustrated in FIG. 14 charges the batteries in power supply device 100 with electric power generated by solar battery 82 that is disposed on a roof or a rooftop of building 81 such as a house, a factory, or the like. The power storage device charges the batteries of power supply device 100 via charging circuit 83 with solar battery 82 serving as a charging power supply, and then supplies electric power to load 86 via DC/AC inverter 85. Thus, the power storage device has a charge mode and a discharge mode. In the power storage device illustrated in the drawing, DC/AC inverter 85 and charging circuit 83 are connected to power supply device 100 via discharging switch 87 and charging switch 84, respectively. Discharging switch 87 and charging switch 84 are turned on and off by power supply controller 88 of the power storage device. In the charge mode, power supply controller 88 turns on charging switch 84, and turns off discharging switch 87 to allow charging from charging circuit 83 to power supply device 100. Furthermore, when charging is completed and the batteries are fully charged or when the batteries are in a state where a capacity equal to or larger than a predetermined value is charged, power supply controller 88 turns off charging switch 84 and turns on discharging switch 87 to switch a mode to the discharge mode, and allow discharging from power supply device 100 to load 86. Further, when needed, power supply controller 88 can supply electric power to load 86 and charge power supply device 100 simultaneously by turning on charging switch 84 and turning on discharging switch 87.

Although not illustrated, the power supply device can also be used as a power supply of a power storage device that stores electricity by charging a battery using midnight electric power at night. The power supply device that is charged with midnight electric power is charged with the midnight electric power that is surplus electric power generated by a power station, and outputs the electric power during the daytime when an electric power load increases. Accordingly, peak electric power during the daytime can be limited to a small value. Further, the power supply device can also be used as a power supply that is charged with both output power of a solar battery and the midnight electric power. This power supply device can efficiently store electricity using both electric power generated by the solar battery and the midnight electric power effectively in consideration of weather and electric power consumption.

The power storage device described above can be suitably used for the following applications: a backup power supply device mountable in a rack of a computer server; a backup power supply device used for radio base stations of cellular phones; a power supply for power storage used at home or in a factory; a power storage device combined with a solar battery, such as a power supply for street lights; and a backup power supply for traffic lights or traffic displays for roads.

INDUSTRIAL APPLICABILITY

The power supply device according to the present invention, an electric vehicle including the power supply device, and an energy storage device are suitably used as a large current power supply used as a power supply for a motor for driving an electric vehicle such as a hybrid automobile, a fuel cell vehicle, an electric vehicle, or an electric motorcycle. Examples of the power supply device include a power supply device for a plug-in hybrid electric automobile and a hybrid electric automobile capable of switching a traveling mode between an EV traveling mode and an HEV traveling mode, and a power supply device for an electric automobile. Furthermore, the power supply device can also be appropriately used for the following applications: a backup power supply device mountable in a rack of a computer server; a backup power supply device used for radio base stations of cellular phones; a power supply for power storage used at home or in a factory; a power storage device combined with a solar battery, such as a power supply for street lights; and a backup power supply for traffic lights.

REFERENCE SIGNS IN THE DRAWINGS

100, 200, 300, 400 power supply device
1 battery cell
1X heat radiation surface
2 binding bar
3 intermediate plate
4 end plate
9 insulating material
9*a* opening region
10 battery stack
12 separator
13 bus bar
16 lower plate
16*a* contact surface
16*b* contact surface
16*d* step
16X uneven surface
16*t* protruding portion
16*x* protruding ridge
16*y* groove
17 heat conductive sheet
17A first heat conductive sheet
17B second heat conductive sheet
17X heat conductive surface
21 upper edge bent portion
22 lower edge bent portion
23 end plate fixing portion
24 end plate fixing portion
25 fastening main surface
25*a* opening portion
27 intermediate plate fixing portion
31 metal collar
60 cooling block
62 compressor
63 condenser
64 receiver tank
65 expansion valve
65A capillary tube
66 on-off valve
67 control circuit
68 cooling mechanism
81 building
82 solar battery
83 charging circuit
84 charging switch
85 DC/AC inverter
86 load
87 discharging switch
88 power supply controller
91 vehicle body
93 motor
94 power generator
95 DC/AC inverter
96 engine
97 wheel
98 charging plug
HV, EV vehicle

The invention claimed is:

1. A power supply device comprising:
   a battery stack including a plurality of battery cells that are layered;
   a pair of end plates disposed at both ends of the battery stack;
   a binding bar configured to connect the pair of end plates;
   a lower plate being contact with a heat radiation surface of each of the plurality of battery cells, the lower plate allowing transfer of heat energy generated by the plurality of battery cells through the lower plate; and
   a heat conductive sheet being stacked on a surface of the lower plate, the heat conductive sheet including plasticity, wherein
   the lower plate includes a contact surface that is contact with the heat conductive sheet, the contact surface including a regular uneven surface,
   the heat conductive sheet is stacked on the regular uneven surface in a pressed state,
   a heat conductive surface of the heat conductive sheet is deformed into a concave shape along the regular uneven surface, and
   the heat conductive sheet and the lower plate are stacked on each other in a contact state.

2. The power supply device according to claim 1, wherein the heat conductive sheet is a flexible sheet formed by bonding heat conductive particles using a binder.

3. The power supply device according to claim 2, wherein the heat conductive sheet is the flexible sheet formed by embedding the heat conductive particles into a silicon resin.

4. The power supply device according to claim 1, wherein the heat conductive sheet includes a thickness which falls within a range from 0.5 mm to 10 mm inclusive.

5. The power supply device according to claim 1, wherein a height of an unevenness of the lower plate is set to a value which falls within a range from 10% to 80% inclusive of the thickness of the heat conductive sheet.

6. The power supply device according to claim 1, wherein a pitch of the unevenness of the regular uneven surface is set to a value which falls within a range from ½ or more and 5 times or less as large as a height of the regular uneven surface of the lower plate.

7. The power supply device according to claim 1, wherein the heat conductive sheet includes:

a first heat conductive sheet stacked on an inner contact surface of the lower plate on a surface close to battery stack; and a second heat conductive sheet stacked on an outer contact surface of the lower plate on an outer side, wherein the lower plate includes the regular uneven surface being either or both of an inner contact surface stacked on the first heat conductive sheet and an outer contact surface stacked on the second heat conductive sheet.

8. The power supply device according to claim 1, wherein the regular uneven surface includes a plurality of rows of protruding ridges extending in a longitudinal direction of the heat radiation surfaces of the plurality of battery cells.

9. The power supply device according to claim 1, wherein the regular uneven surface includes a plurality of rows of protruding ridges extending in a direction that intersects with the longitudinal direction of the heat radiation surface of each of the plurality of battery cells.

10. The power supply device according to claim 1, wherein the regular uneven surface includes a groove between the plurality of rows of protruding ridges that are arranged in parallel being a corrugated cross-sectional shape.

11. The power supply device according to claim 1, wherein a distal end portion of a protruding portion of the regular uneven surface includes in a flat plate shape or a curved shape.

12. An electric vehicle including the power supply device according to claim 1, the electric vehicle comprising:
- the power supply device;
- a motor for traveling vehicle that is configured to receive electric power from the power supply device;
- a vehicle body on which the power supply device and the motor are mounted; and
- a wheel that is configured to be driven by the motor for enabling traveling of the vehicle body.

13. A power storage device including the power supply device according to claim 1, the power storage device comprising:
- the power supply device; and
- a power supply controller configured to control charging and discharging of the power supply device, wherein the power supply controller enables charging of the plurality of battery cells with electric power supplied from an outside and is configured to control charging the plurality of battery cells.

* * * * *